(12) United States Patent
Sugita

(10) Patent No.: US 8,760,771 B2
(45) Date of Patent: Jun. 24, 2014

(54) ZOOM LENS AND IMAGE PICKUP APPARATUS HAVING THE SAME

(75) Inventor: Shigenobu Sugita, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 13/440,682

(22) Filed: Apr. 5, 2012

(65) Prior Publication Data

US 2012/0262797 A1    Oct. 18, 2012

(30) Foreign Application Priority Data

Apr. 15, 2011    (JP) ................... 2011-090963

(51) Int. Cl.
*G02B 15/14* (2006.01)
(52) U.S. Cl.
USPC .......................................... 359/683; 359/682
(58) Field of Classification Search
USPC ........................................................ 359/682
See application file for complete search history.

(56) References Cited

U.S. PATENT DOCUMENTS

| | | |
|---|---|---|
| 7,184,221 B2 | 2/2007 | Misaka |
| 2009/0273846 A1 * | 11/2009 | Ori .................................. 359/684 |
| 2010/0091170 A1 | 4/2010 | Miyazaki et al. |
| 2010/0091171 A1 | 4/2010 | Miyazaki et al. |
| 2011/0116174 A1 | 5/2011 | Suzuki et al. |

FOREIGN PATENT DOCUMENTS

| | | |
|---|---|---|
| CN | 101571624 A | 11/2009 |
| EP | 791845 A2 | 8/1997 |
| JP | 5273467 A | 10/1993 |
| JP | 7333503 A | 12/1995 |
| JP | 8220438 A | 8/1996 |
| JP | 9197277 A | 7/1997 |
| JP | 9230239 A | 9/1997 |
| JP | 2005284099 A | 10/2005 |
| JP | 2008052174 A | 3/2008 |

* cited by examiner

*Primary Examiner* — James Jones
(74) *Attorney, Agent, or Firm* — Canon USA Inc. IP Division

(57) ABSTRACT

A zoom lens includes an aperture stop and a plurality of lens units which are moved during zooming. The plurality of lens units includes, on an object side of the aperture stop, a lens unit Lp having a positive refractive power and a lens unit Ln having a negative refractive power which is disposed to be adjacent to an image side of the positive lens unit Lp. At least one of the positive lens unit Lp and the negative lens unit Ln includes two or less lenses which are moved during focusing, and a focal length Fp of the positive lens unit Lp and a focal length Fn of the negative lens unit Ln are appropriately set based on predetermined mathematical conditions.

23 Claims, 31 Drawing Sheets

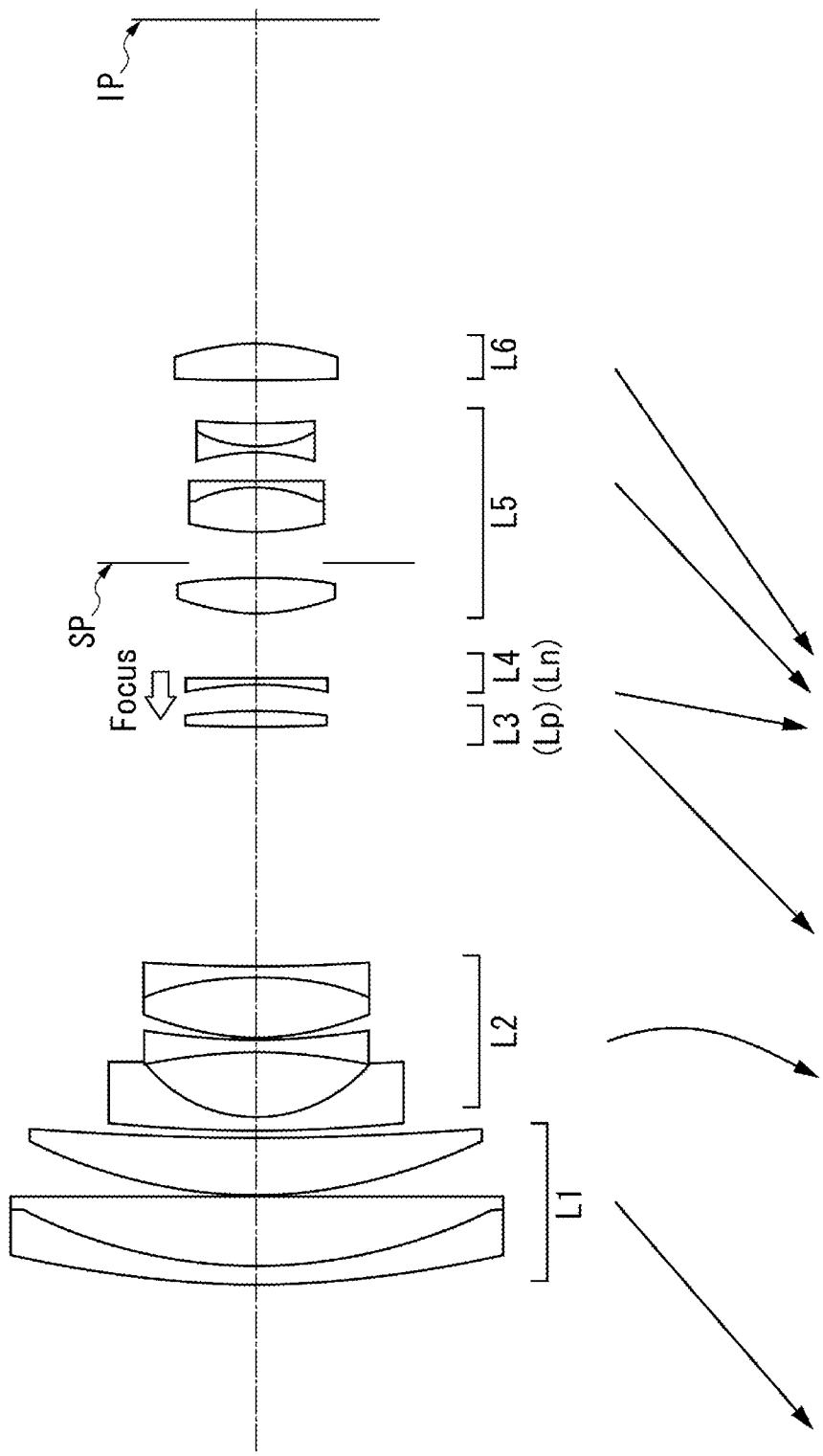

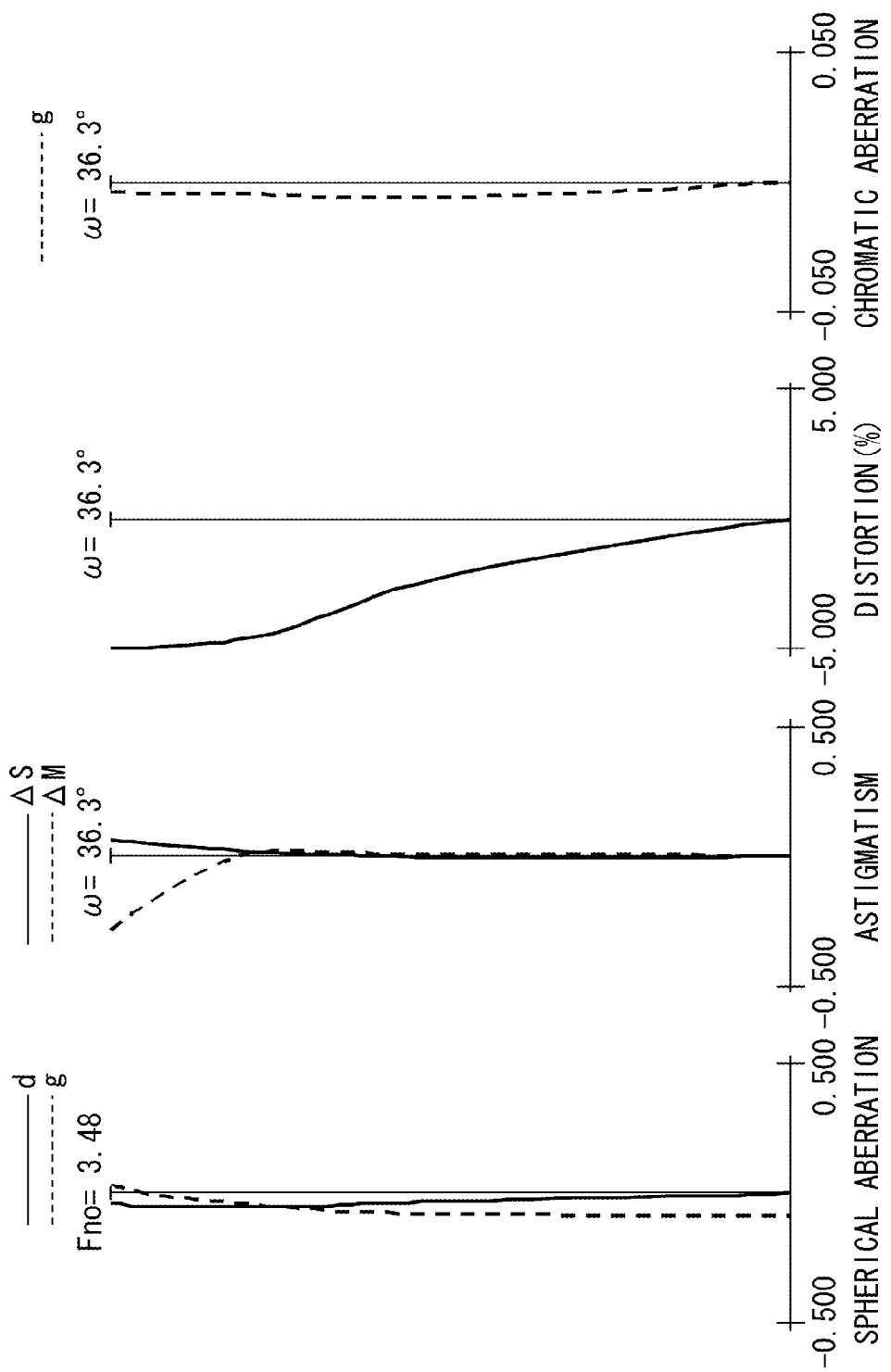

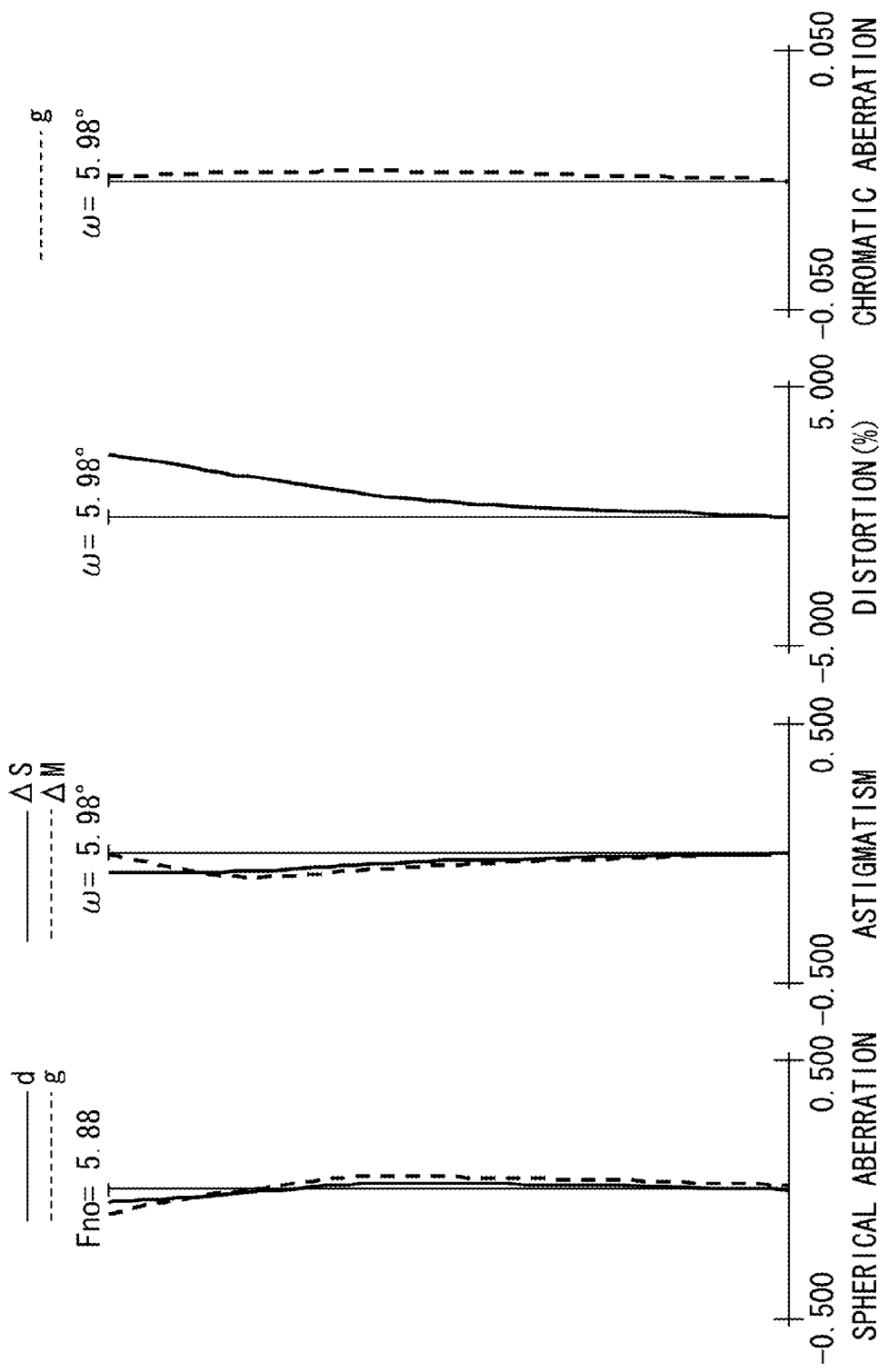

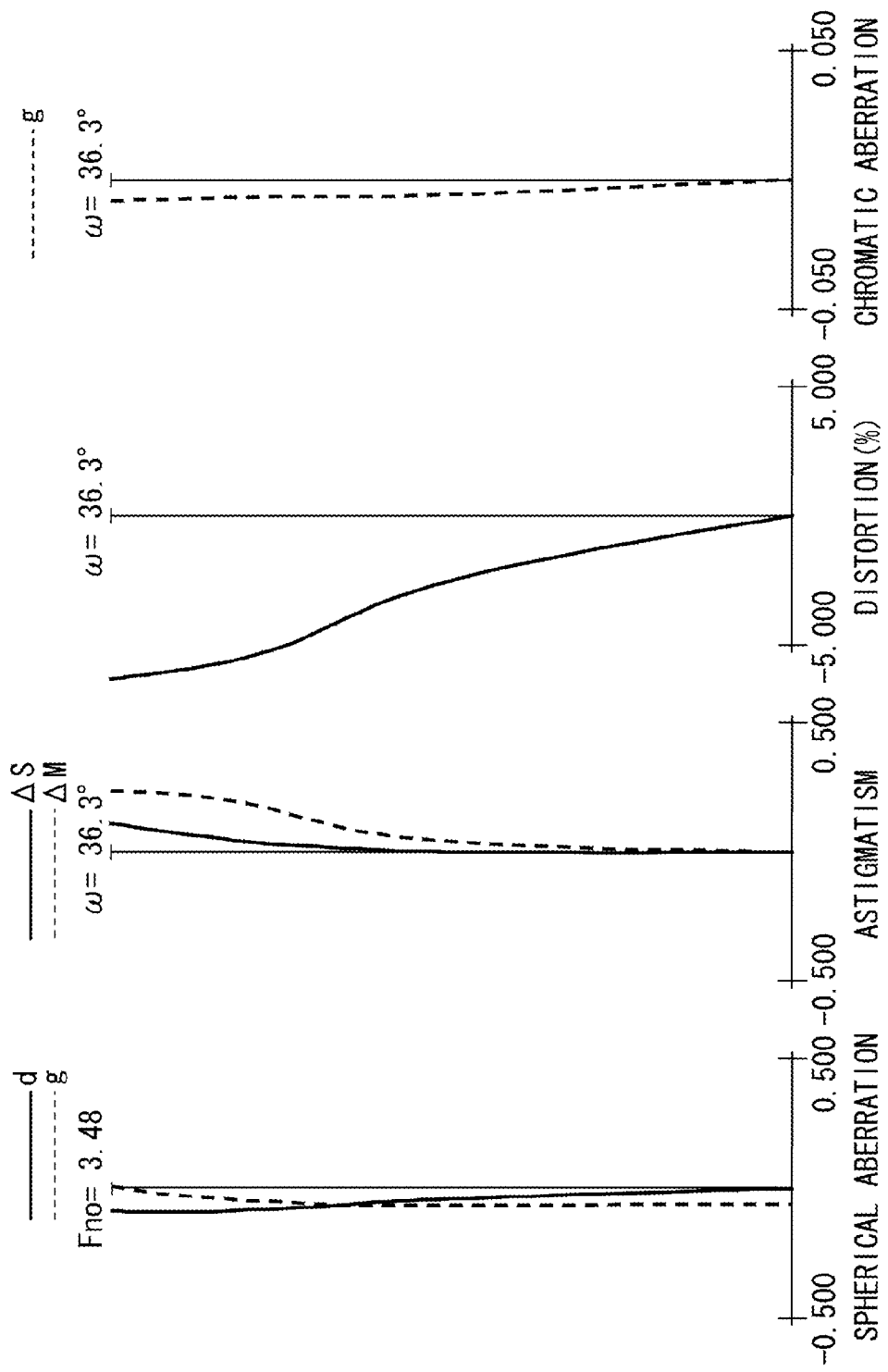

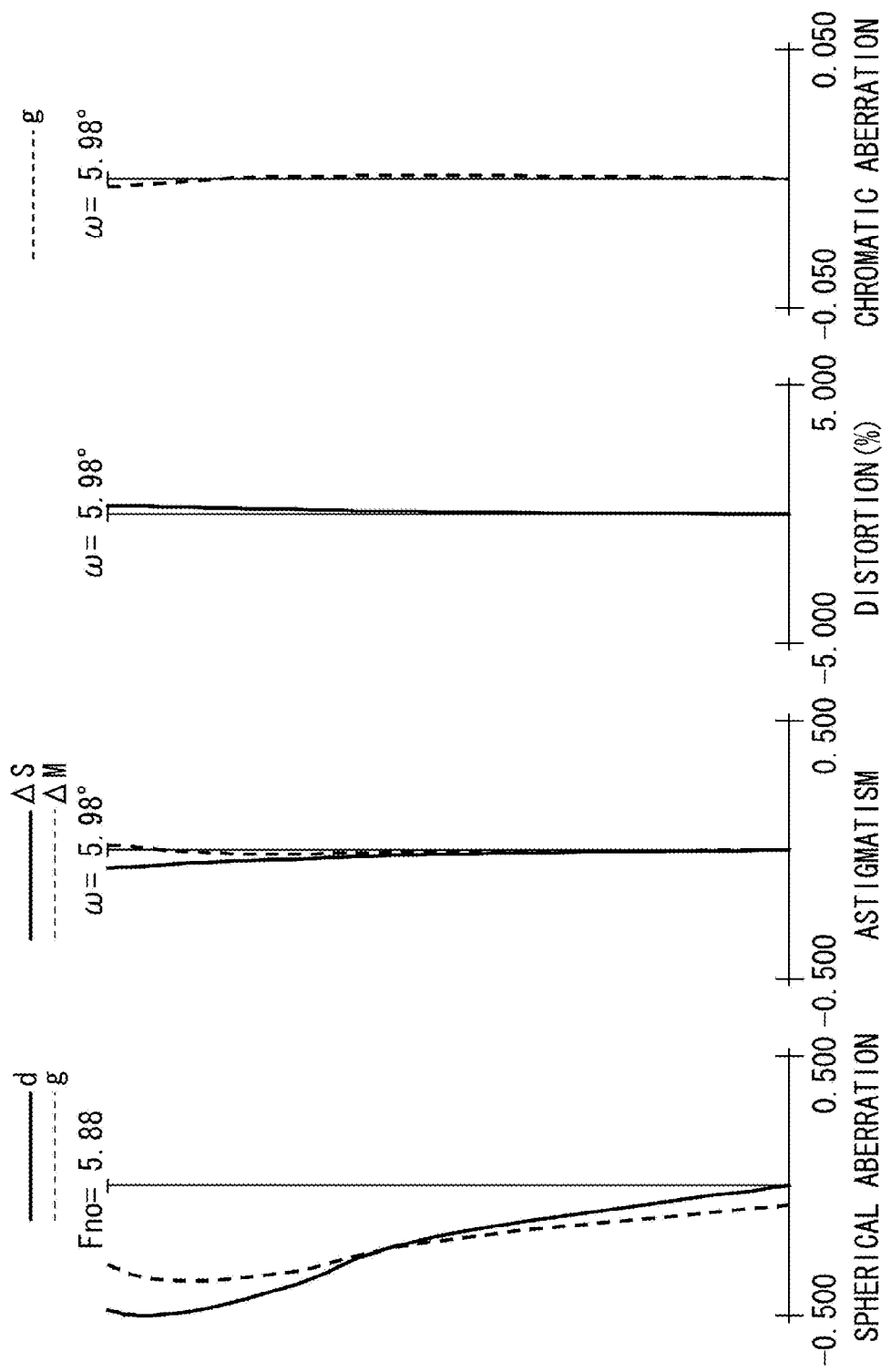

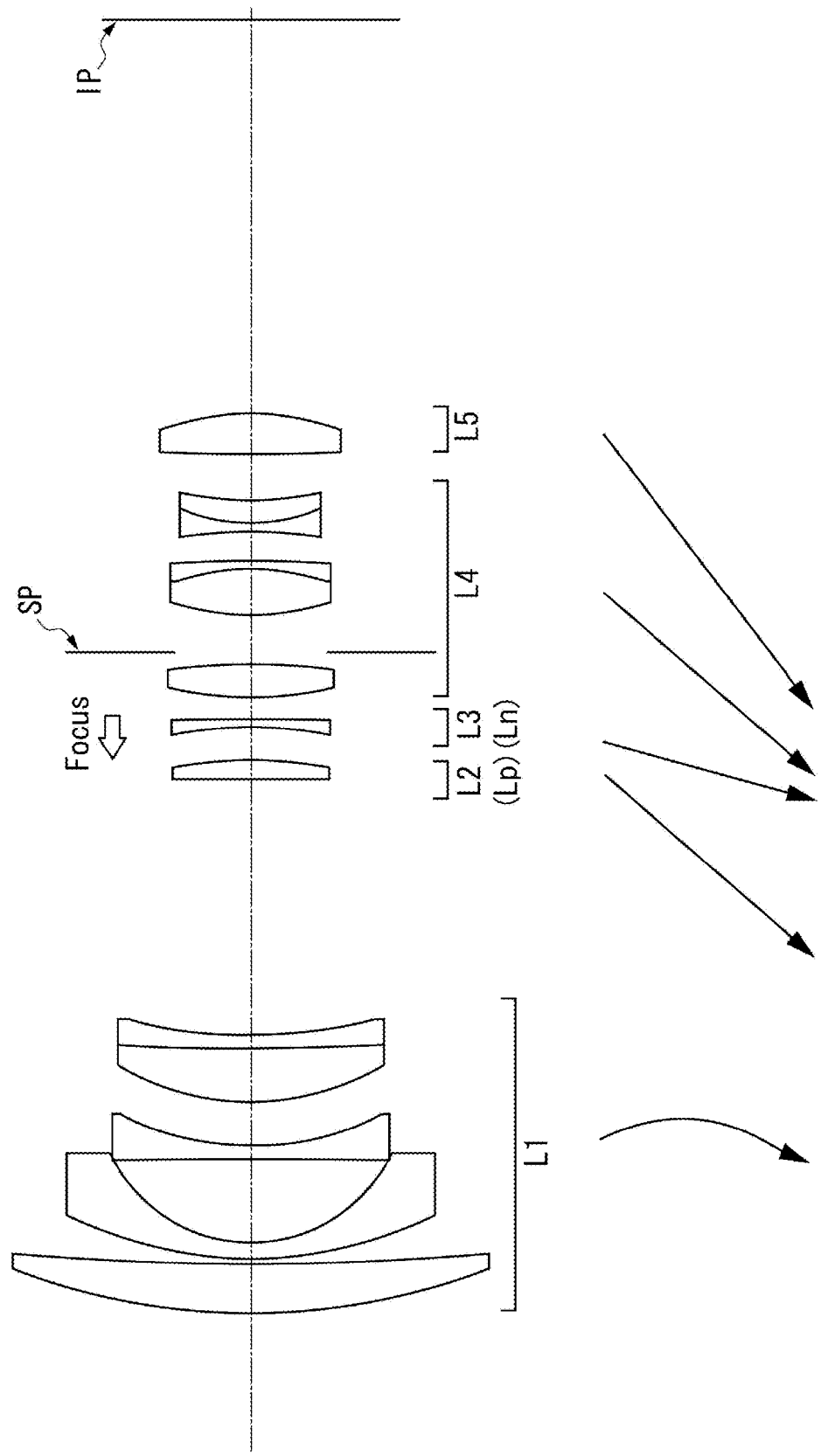

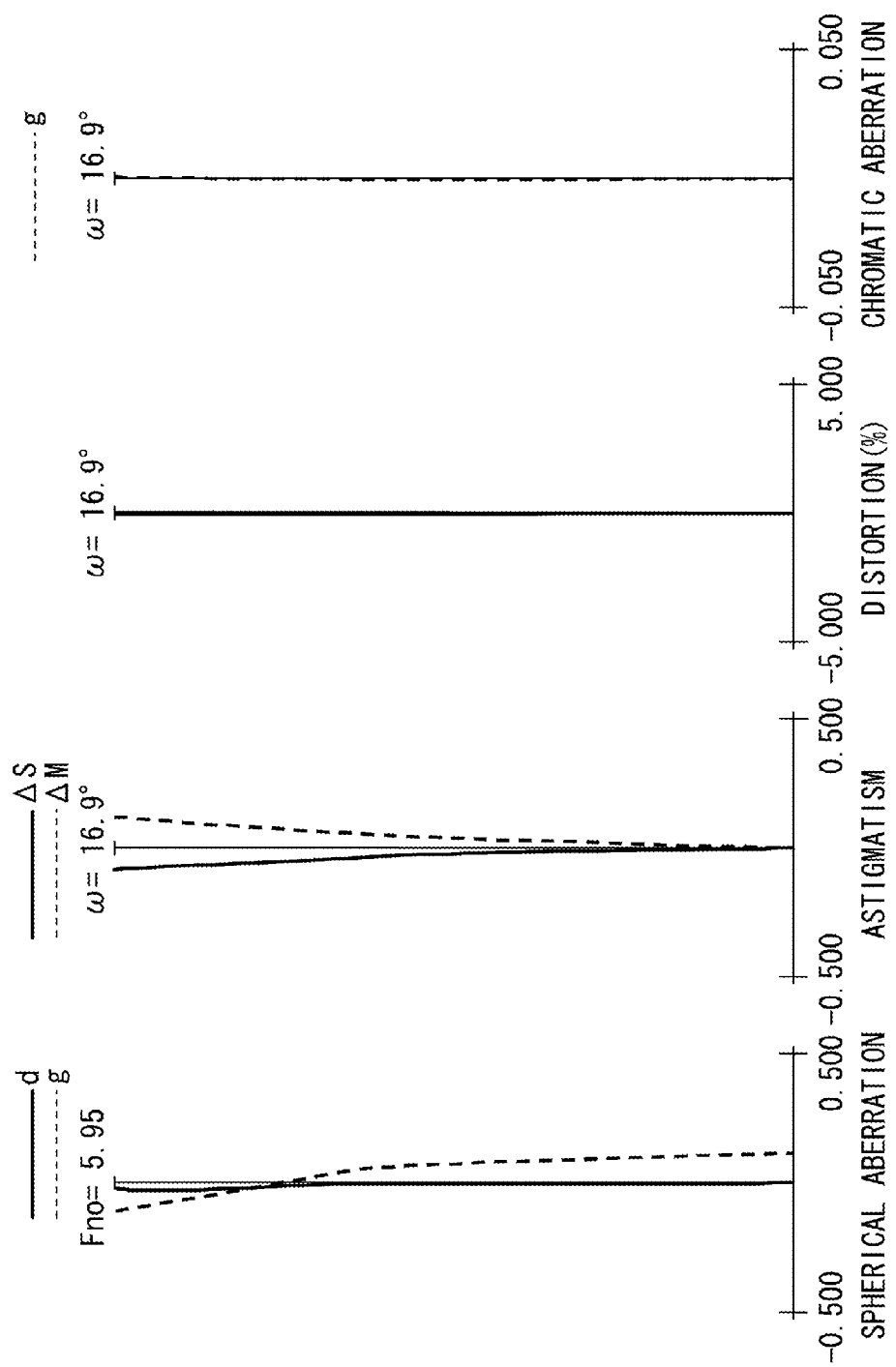

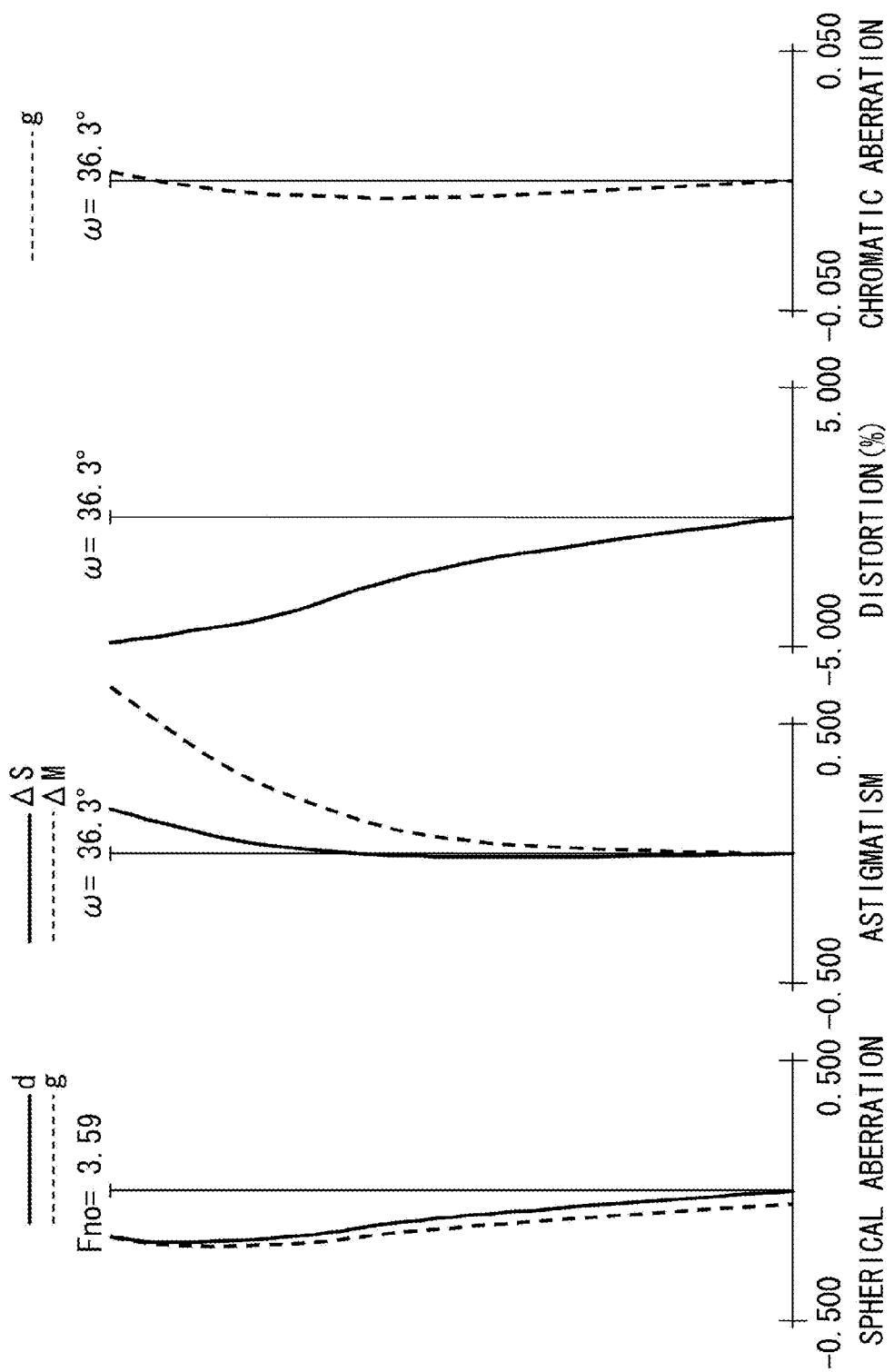

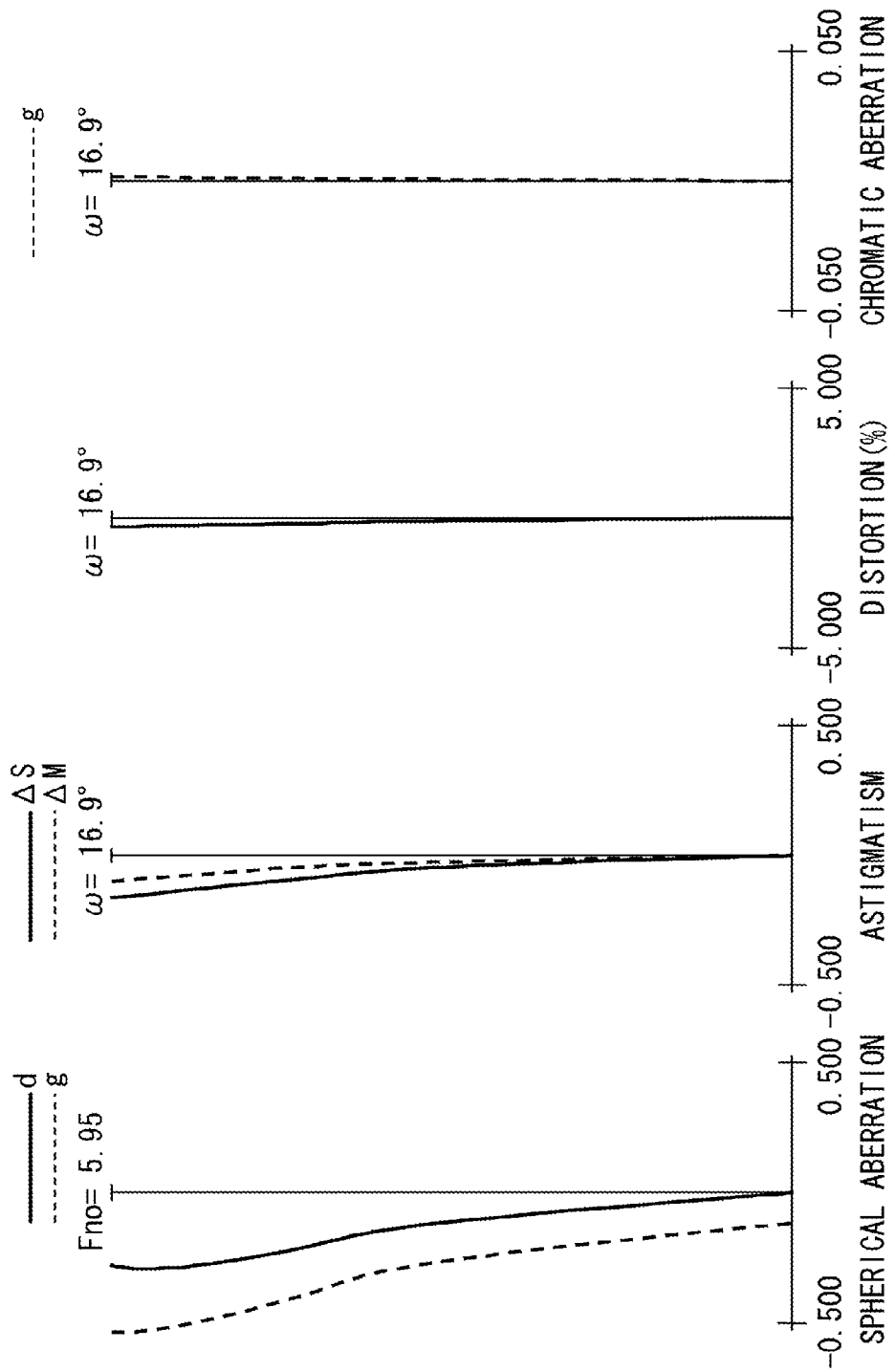

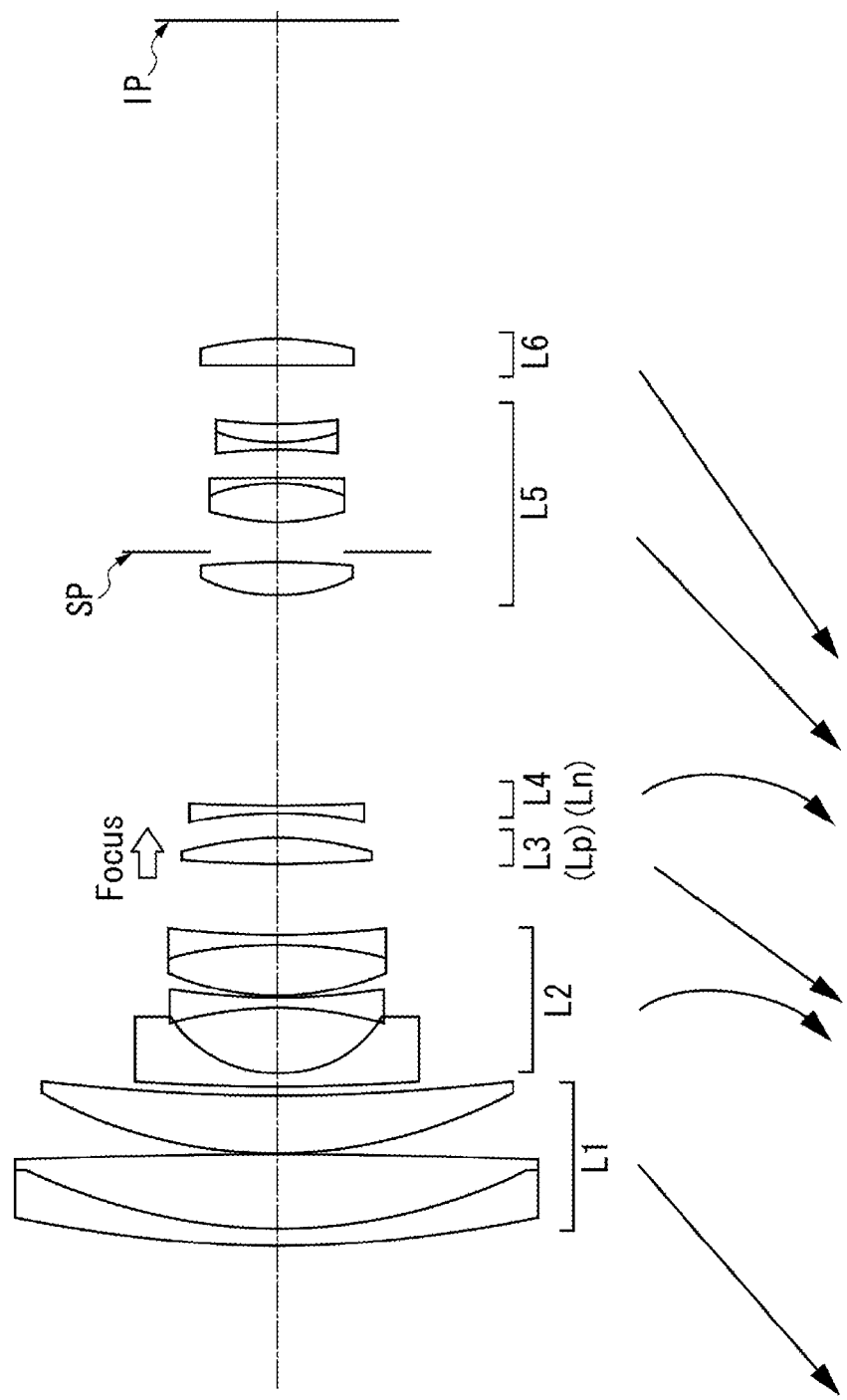

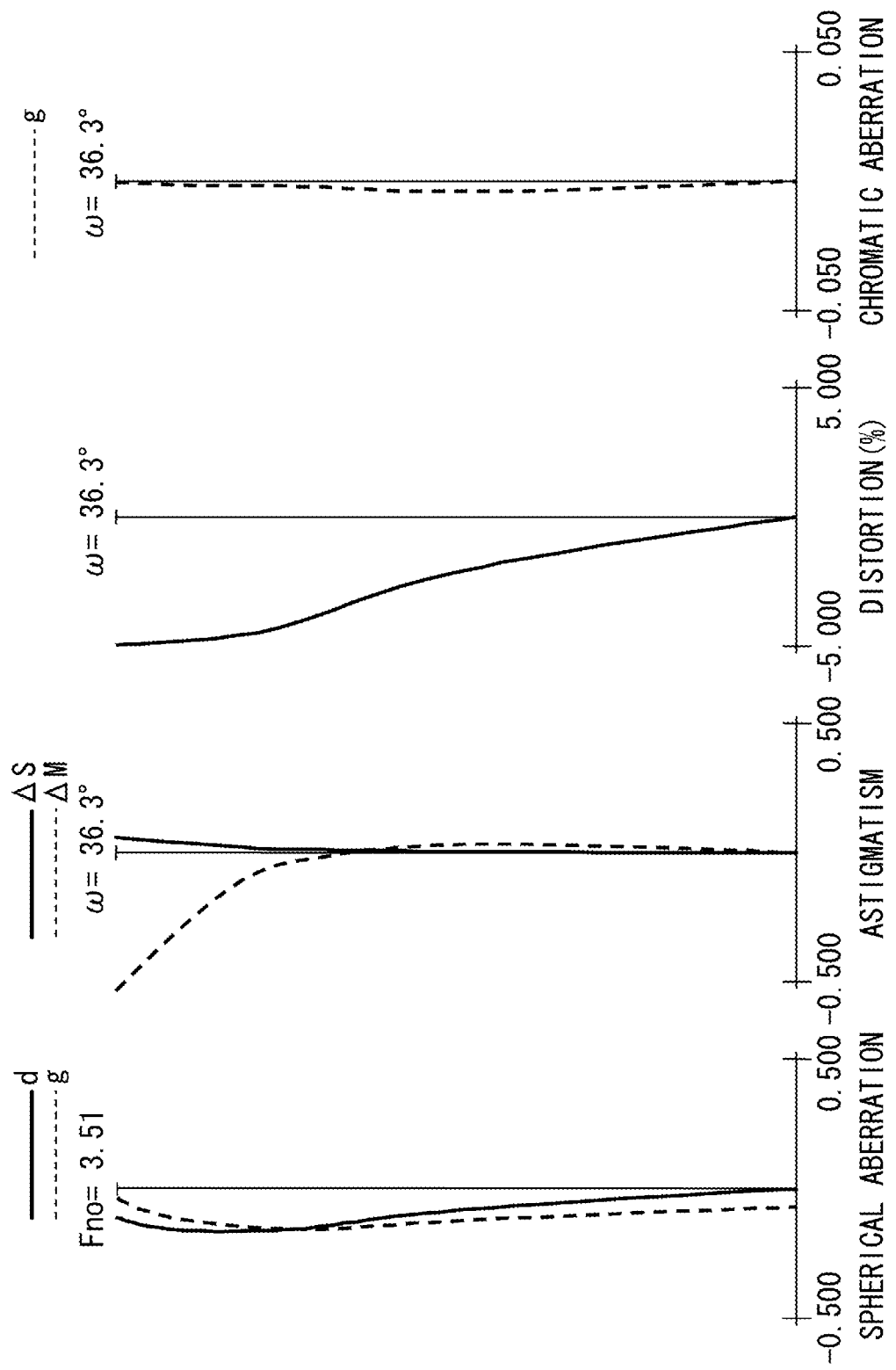

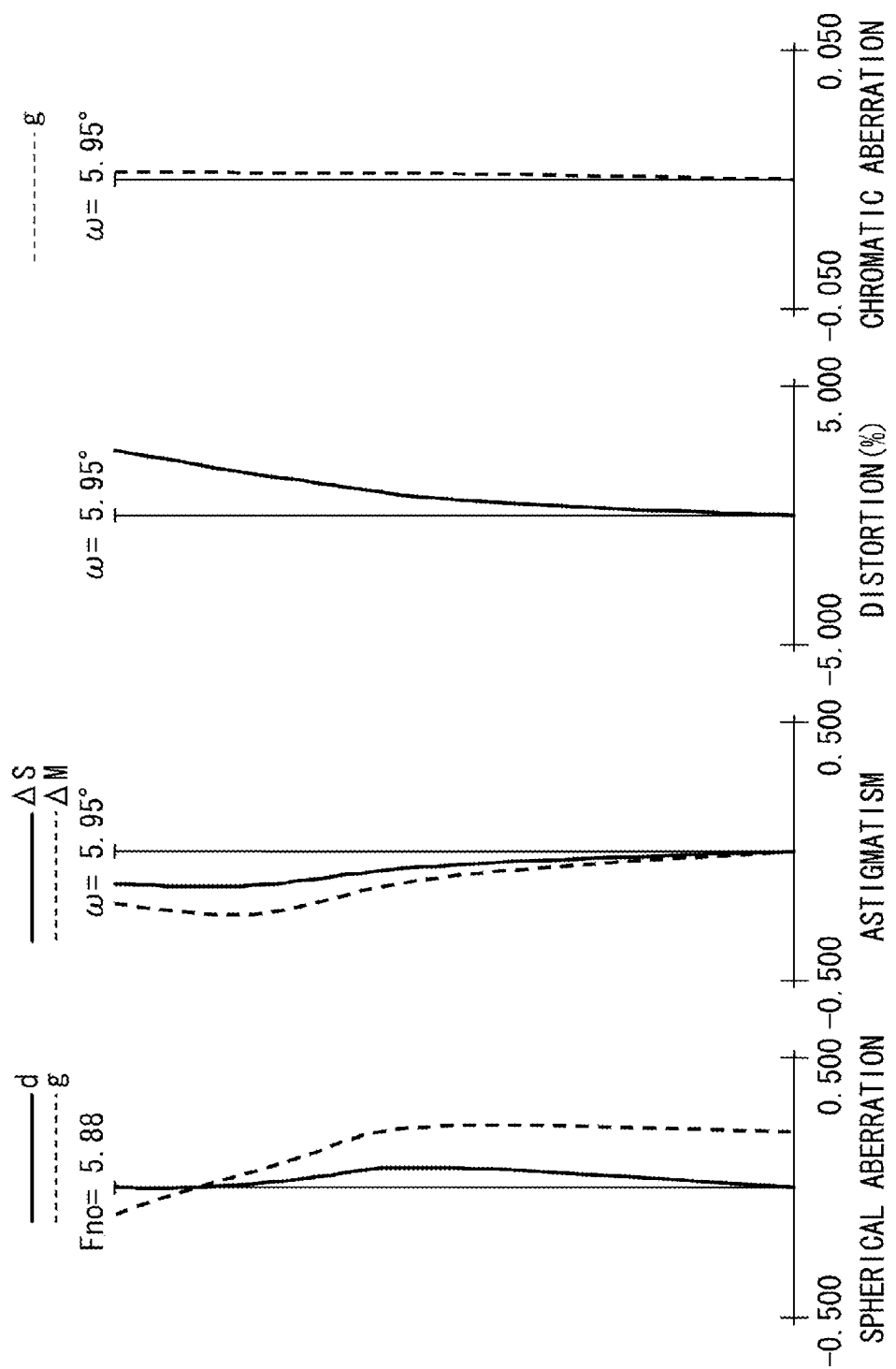

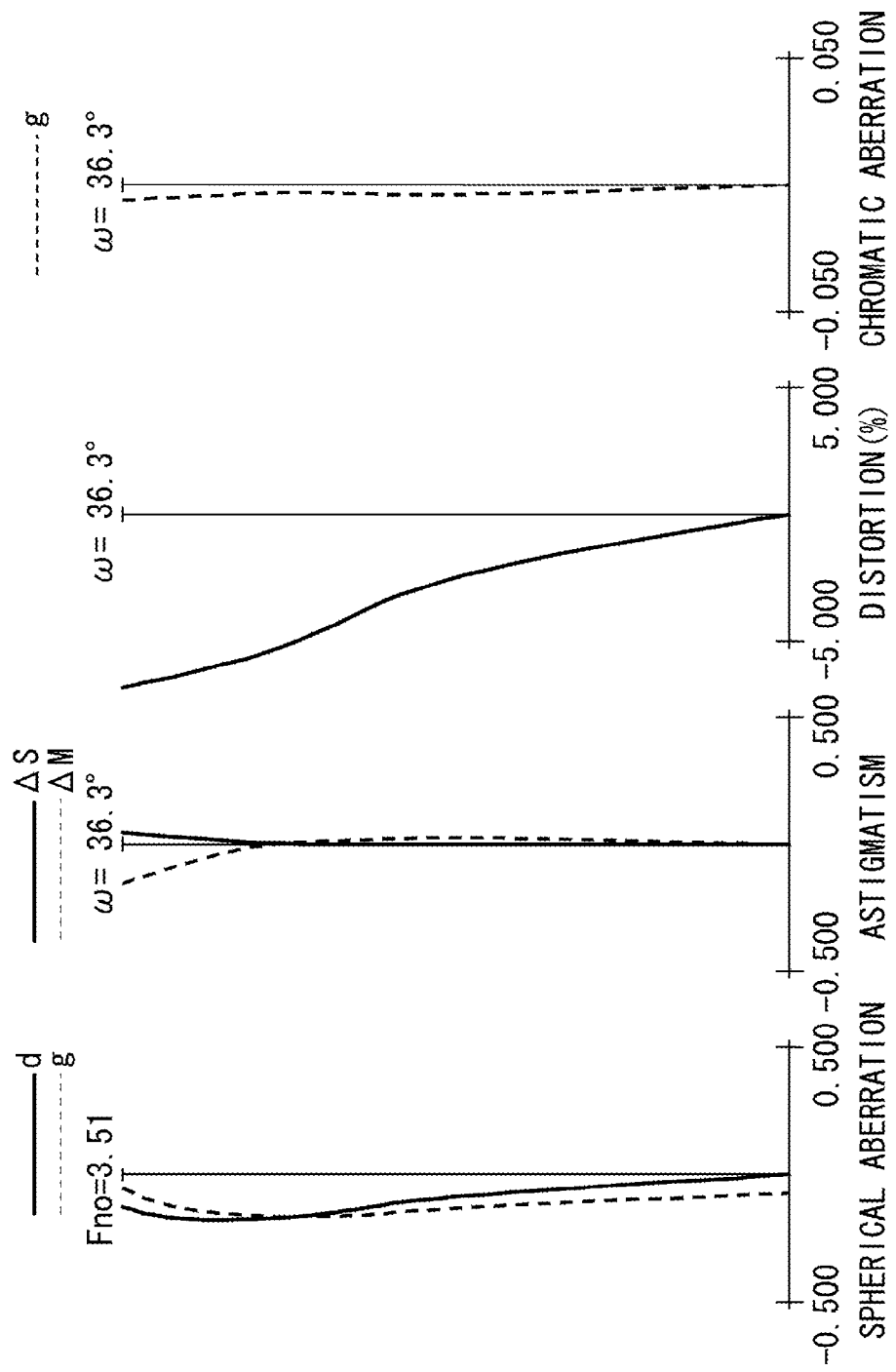

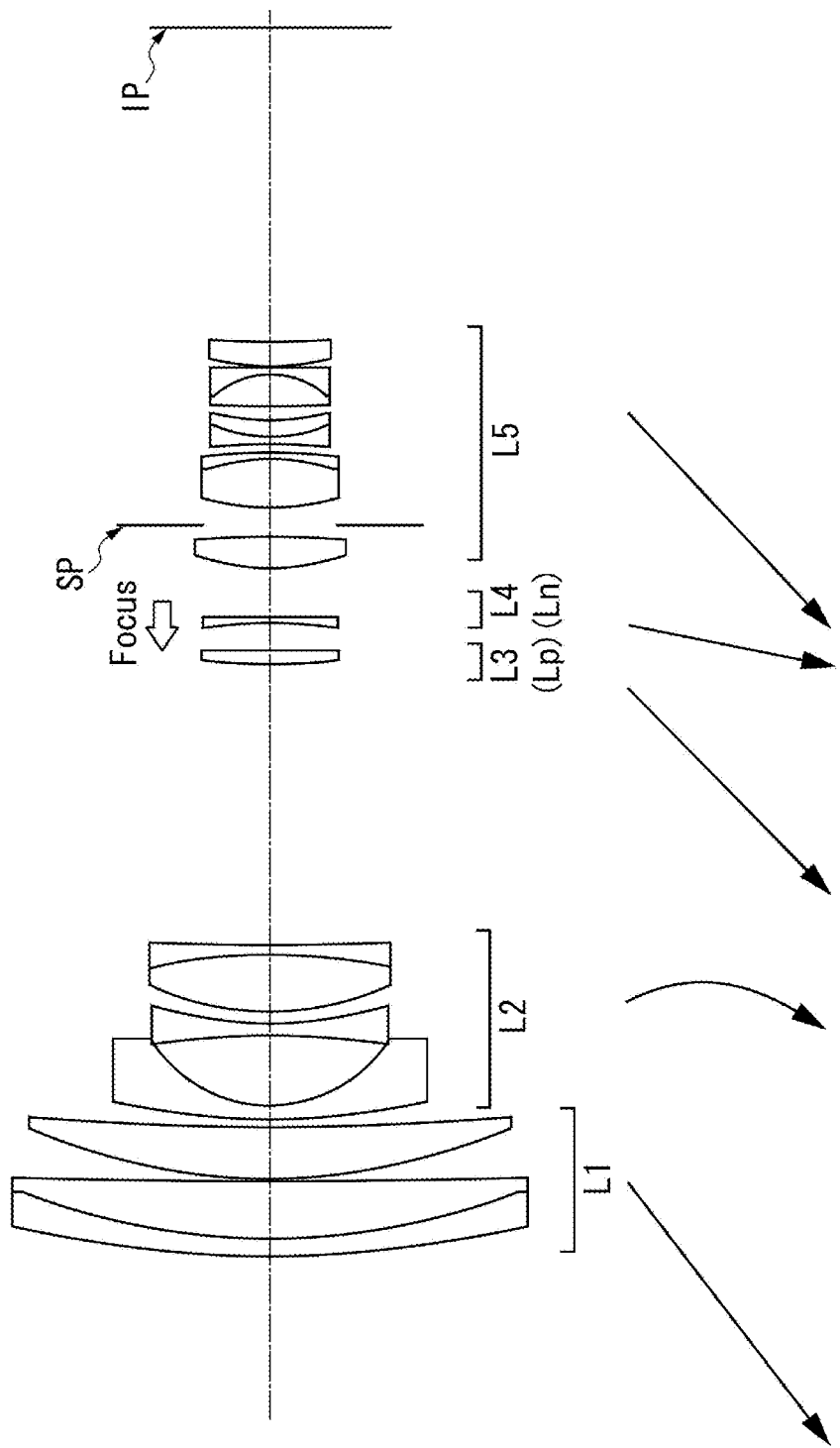

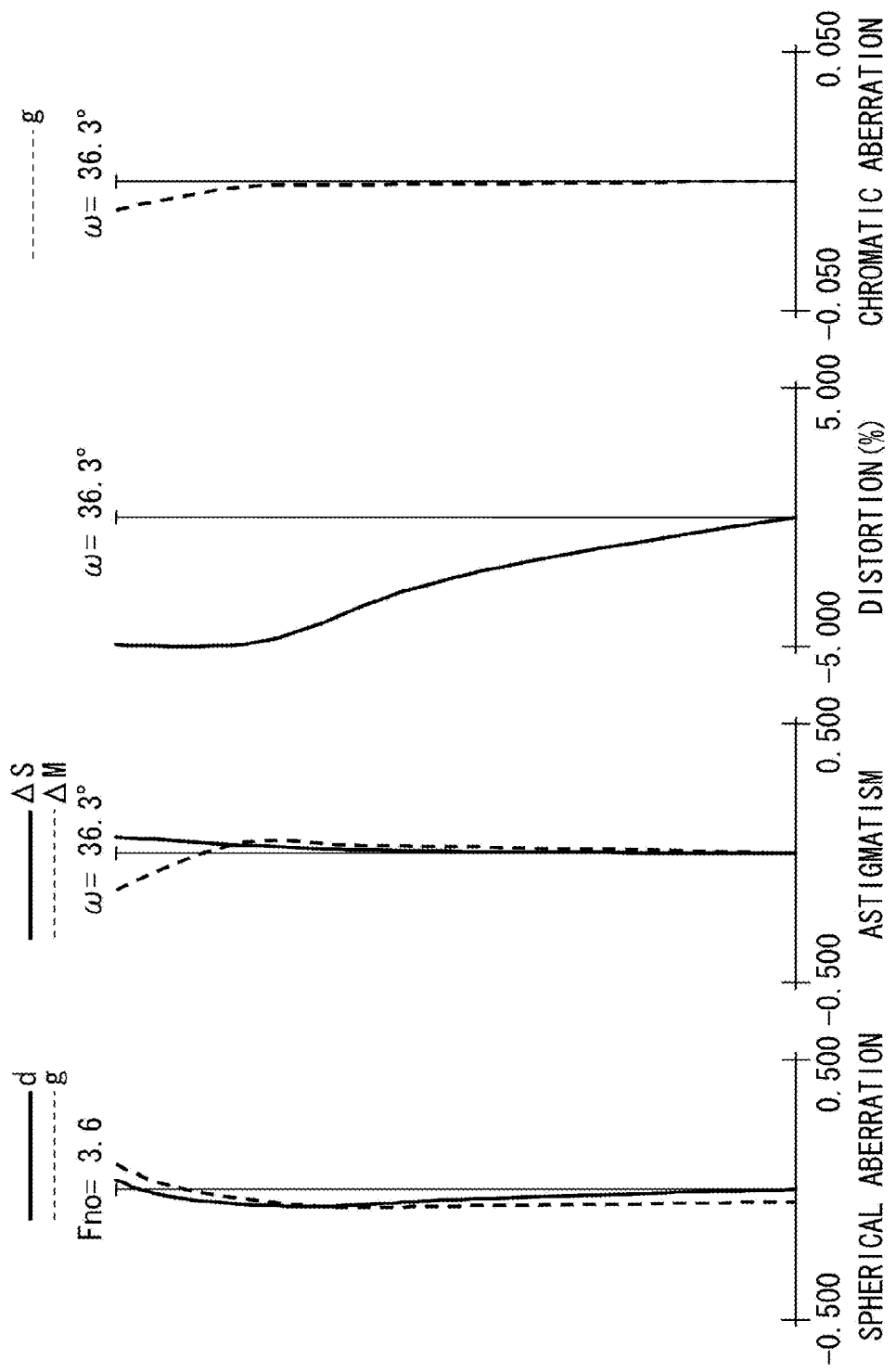

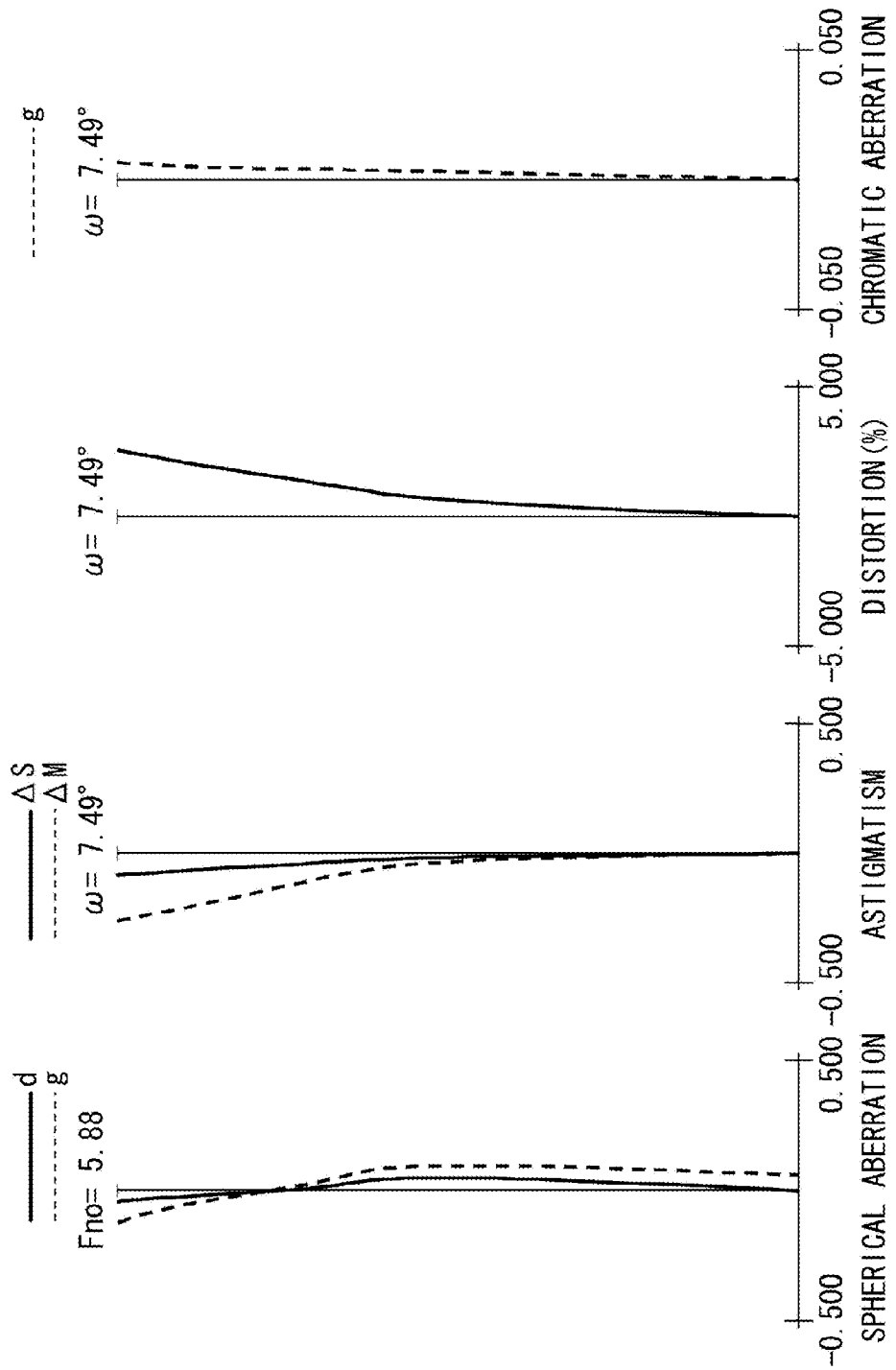

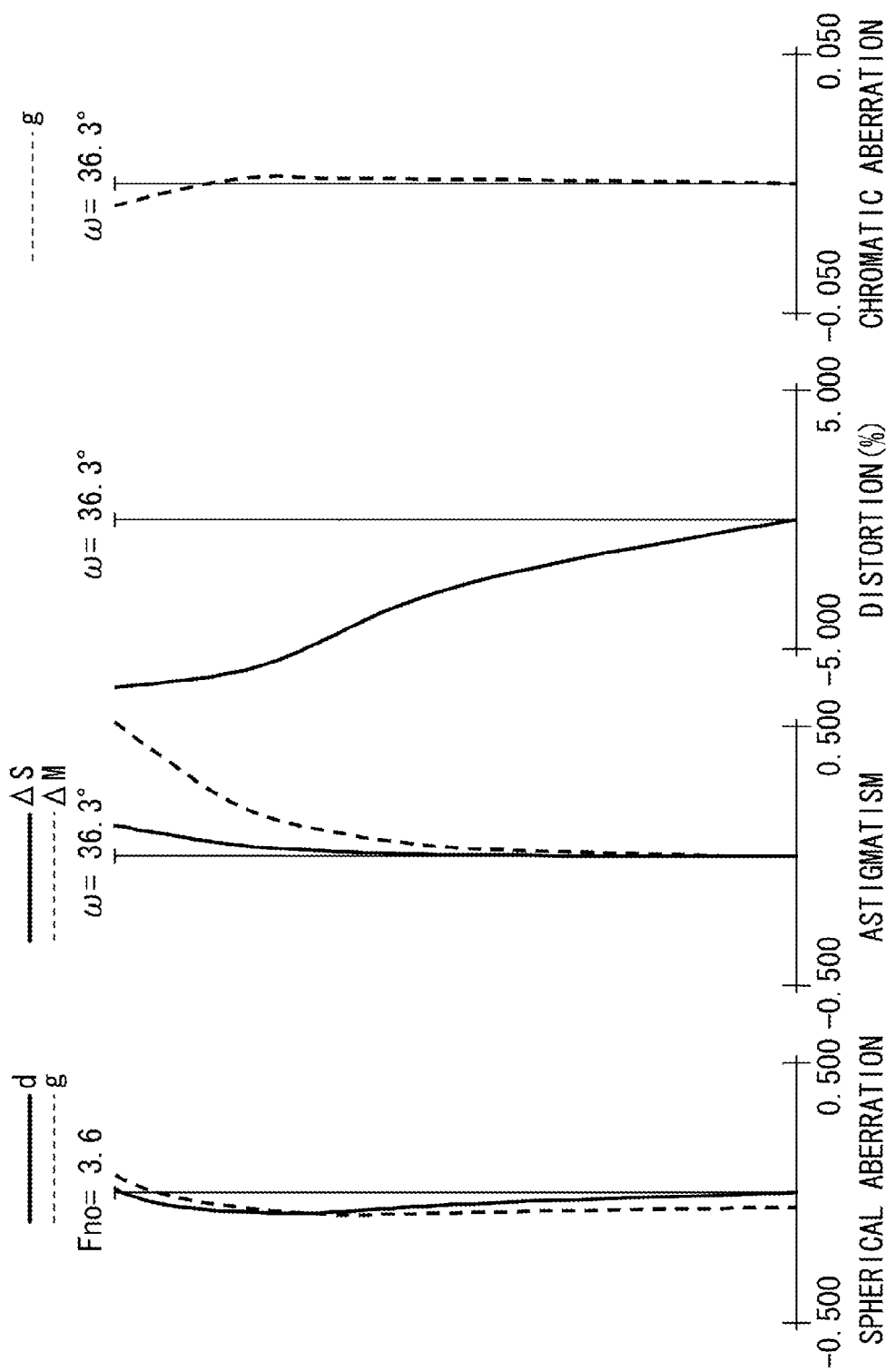

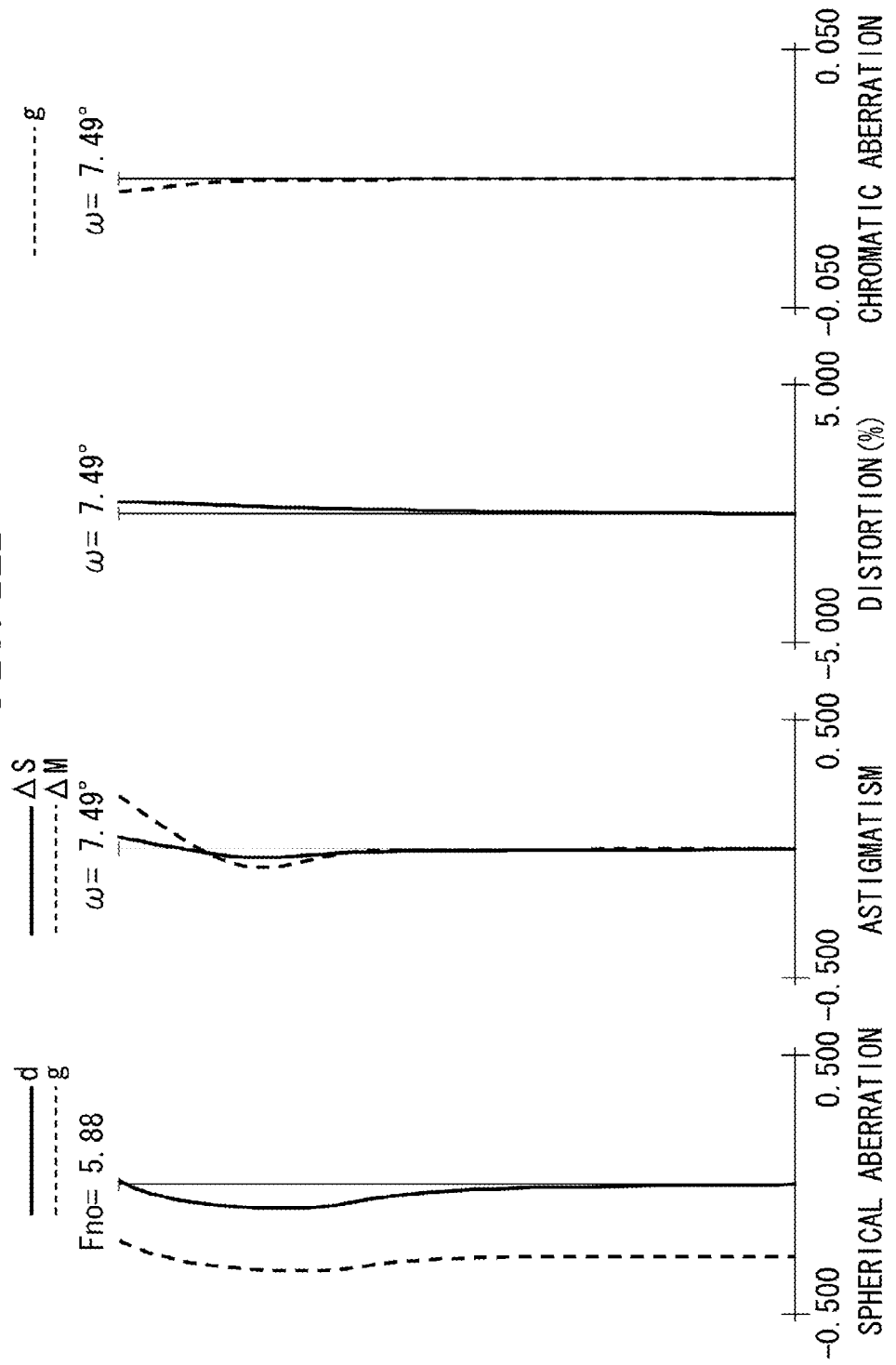

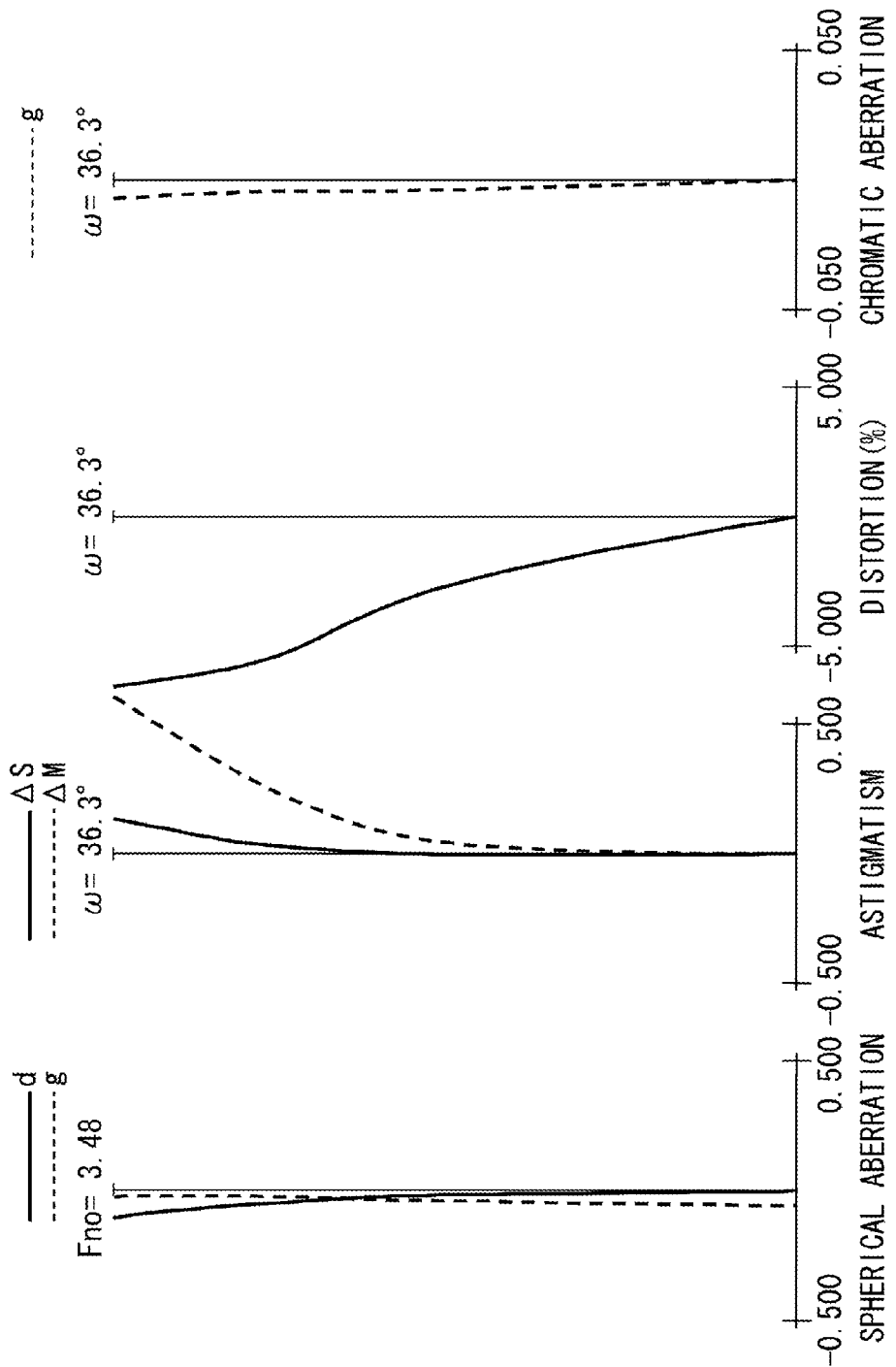

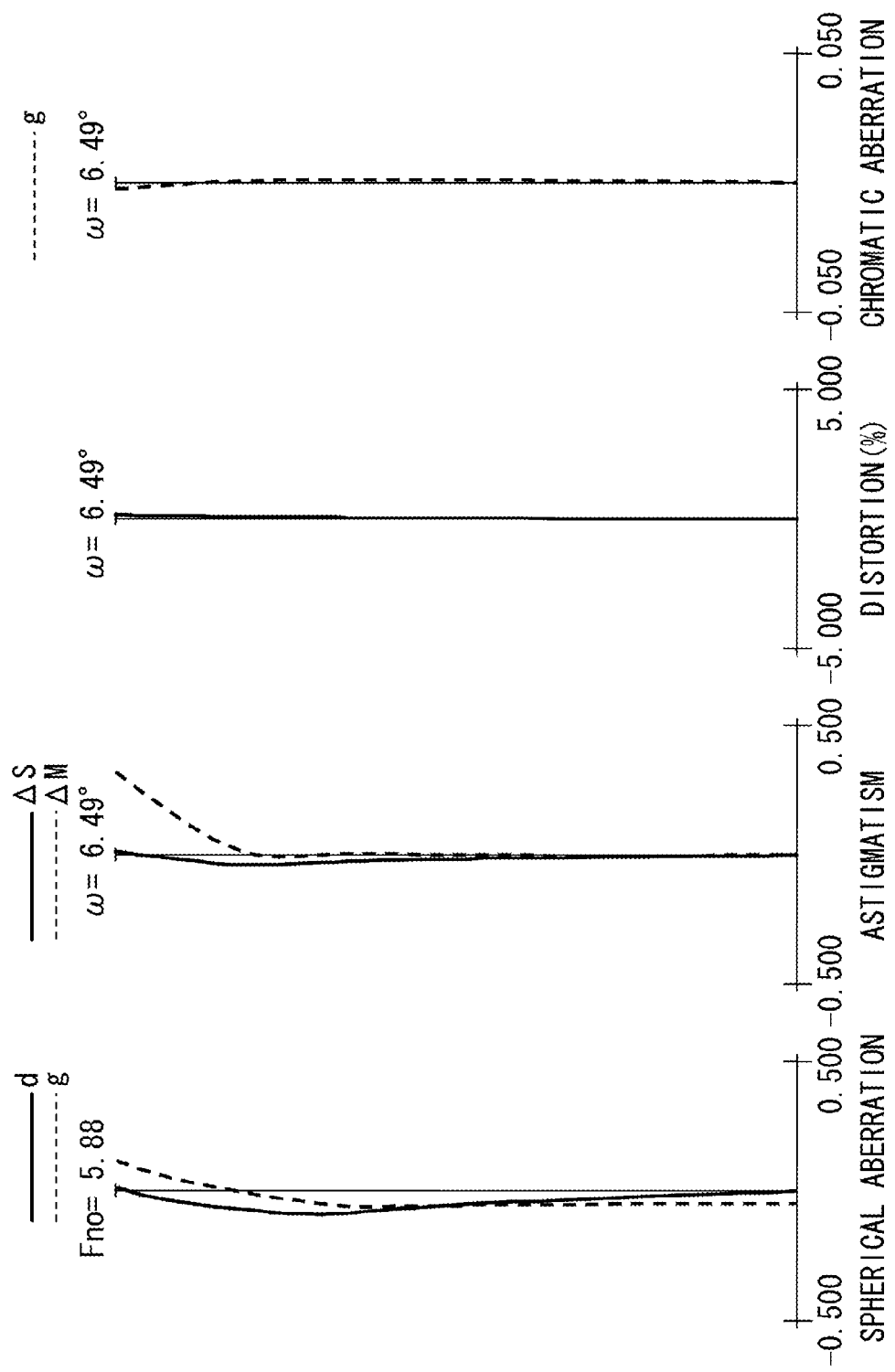

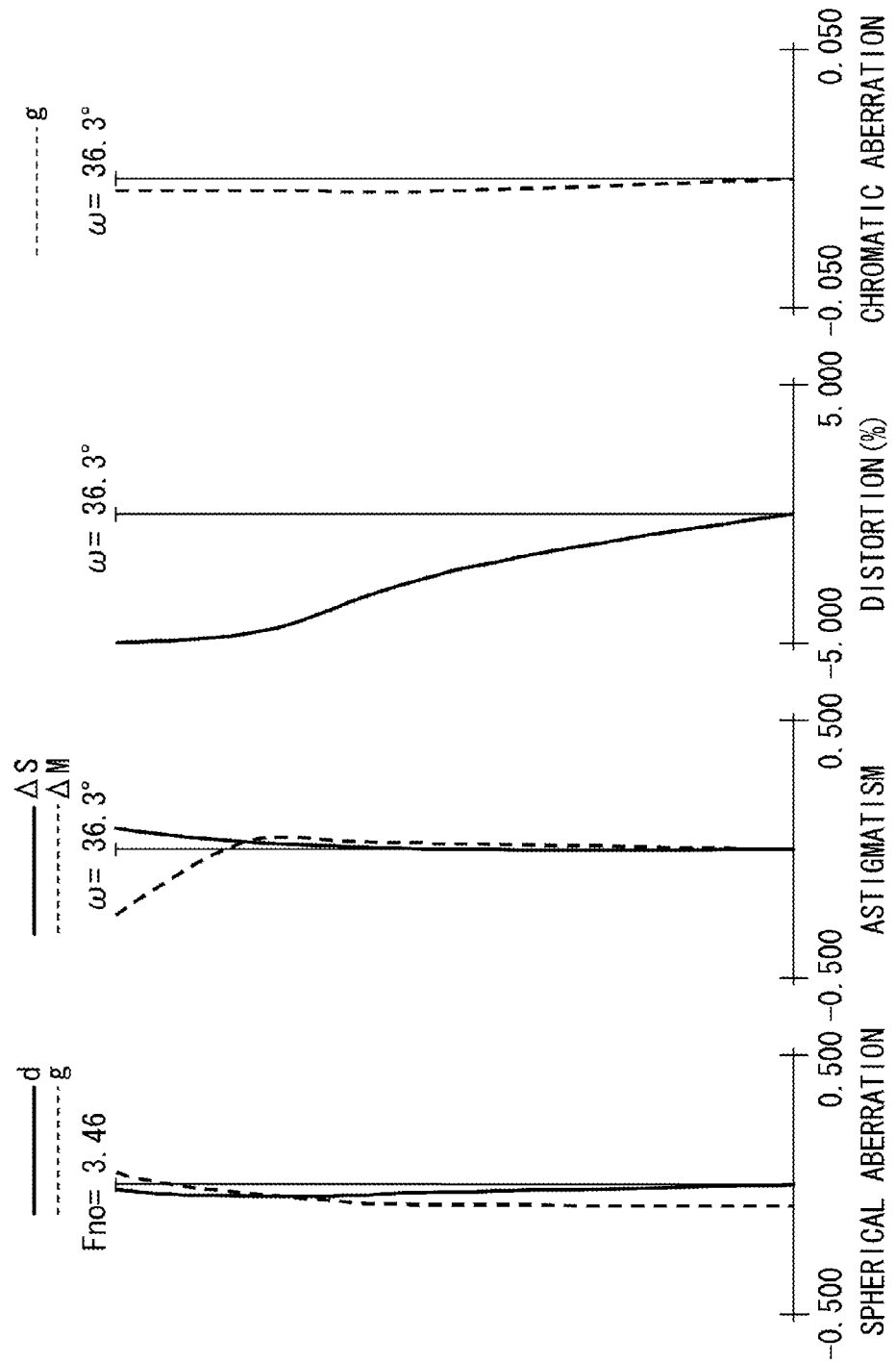

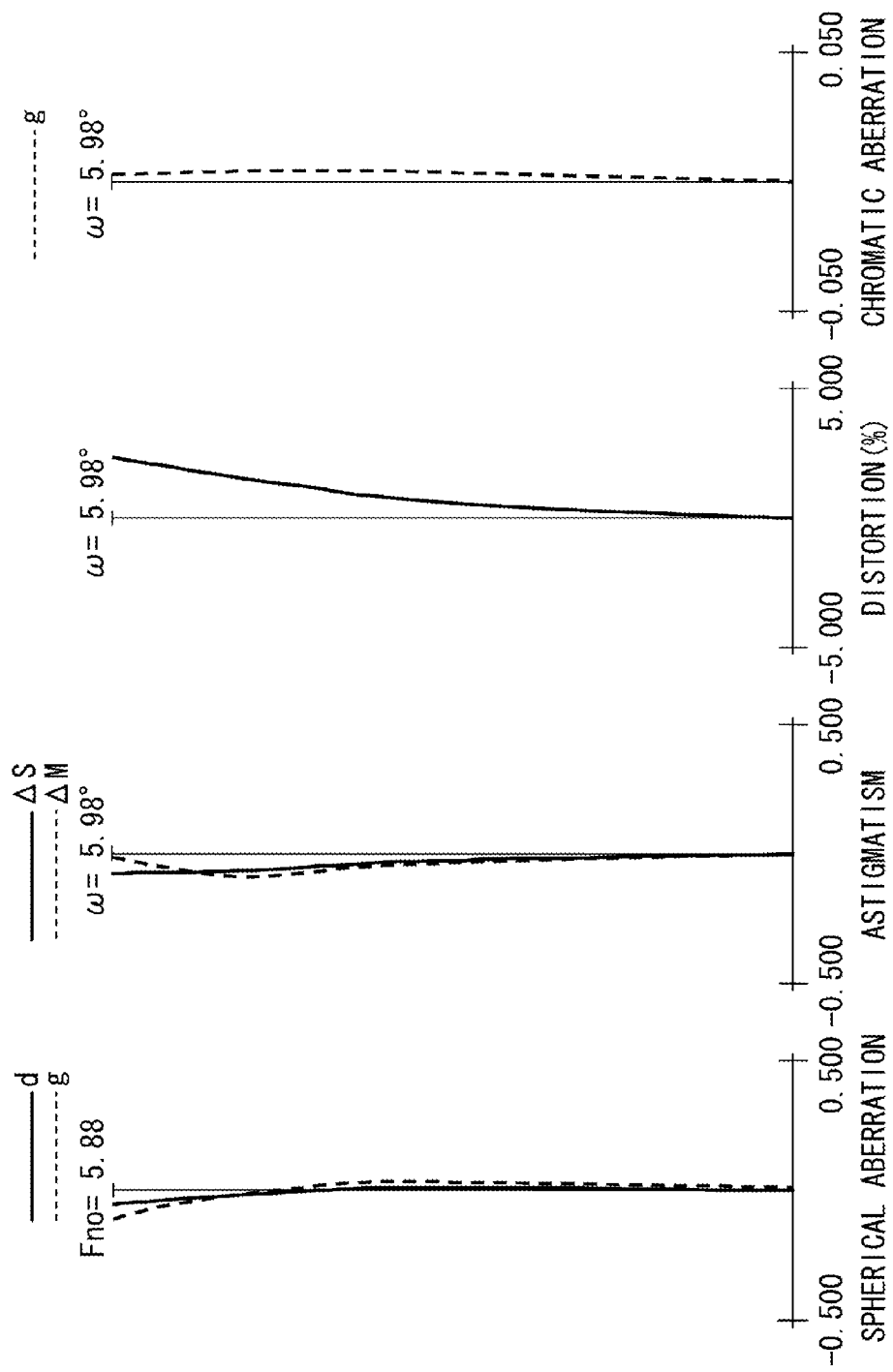

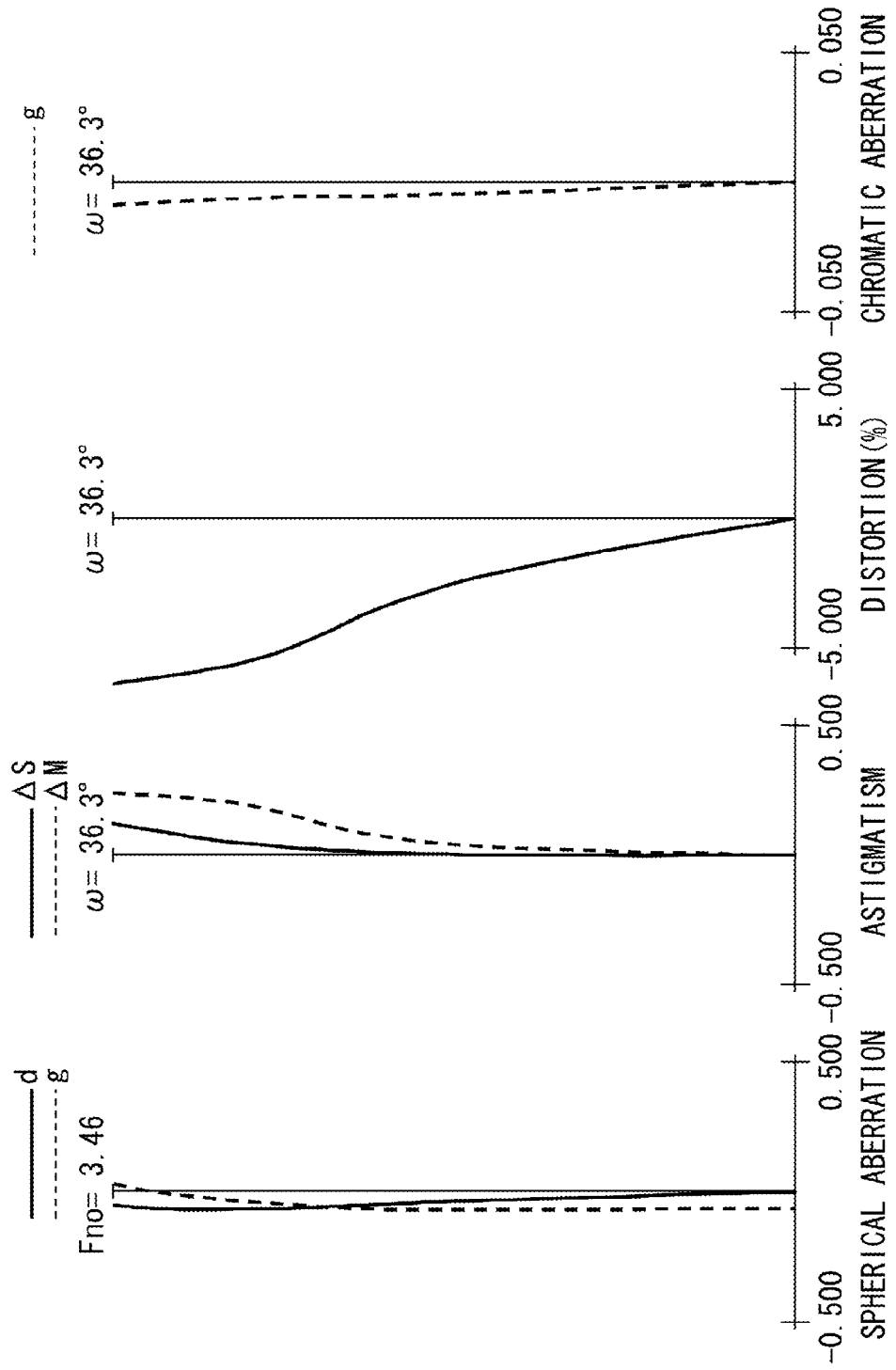

ZOOM LENS AND IMAGE PICKUP APPARATUS HAVING THE SAME

BACKGROUND OF THE INVENTION

1. Field of the Invention

The present invention relates to a zoom lens and an image pickup apparatus including the zoom lens; the zoom lens may be suitable for use as a photographic optical system in, for example, a single-lens reflex camera, a digital still camera, a digital video camera, a TV camera, a monitoring camera, or the like.

2. Description of the Related Art

There is an increasing demand for an image pickup apparatus, such as a single-lens reflex camera, a video camera, or the like, capable of performing autofocusing (AF) at high speed with high accuracy. Conventionally, phase difference autofocusing has been widely used as an autofocusing method for capturing a still image. On the other hand, in recent single-lens reflex cameras, functions of capturing a moving image and autofocusing during capturing a moving image have been demanded. As an autofocusing method for use in capturing a moving image, contrast type autofocusing has been widely used. In the contrast type autofocusing, a focusing state of a photographic optical system is evaluated by detecting a high frequency component of a captured image signal.

In an image pickup apparatus using the contrast type autofocusing method, the direction shifted from an in-focus state is detected by vibrating a focus lens unit in an optical axis direction at a high speed (hereinafter, referred to as "wobbling"). Next, after the wobbling, an optimal position of the focus lens unit, that is, the in-focus state, is calculated by detecting a signal component of a specific frequency band of an image area, from an output signal of an image sensor. After that, the focus lens unit is moved to the optimal position, so that the focusing is completed.

In the case of capturing a moving image, in order to reduce the focusing time, the focus lens unit needs to be driven at a high speed. In addition, the focus lens unit needs to be driven as quietly as possible so that a driving sound of a motor cannot be recorded. Therefore, in order to minimize a load of the motor, a small and light-weight focus lens unit has been demanded. In an image pickup apparatus using a phase difference autofocusing method, the use of a small and light focus lens unit is also demanded. There has been known a zoom lens which performs focusing by partially adopting the small and light lens units among the entire lens units constituting the zoom lens.

U.S. Pat. No. 7,184,221 discusses, for example, a zoom lens in which a negative lens unit and a positive lens unit are disposed at an image side in this order and focusing is performed by the negative lens unit, which is small and light-weight. U.S. Patent Application Publication No. 2010/0091170 discusses a zoom lens including first to fifth lens units having positive, negative, negative, positive, and positive refractive powers, respectively, in order from the object side to the image side, in which focusing is performed by the third lens unit. U.S. Patent Application Publication No. 2010/0091171 discusses a five-unit zoom lens including first to fifth lens units having positive, negative, positive, positive, and positive refractive powers, respectively, in which focusing is performed by using the third lens unit. U.S. Patent Application Publication No. 2011/0116174 discusses a four-unit zoom lens including first to fourth lens units having positive, negative, positive, and positive refractive powers, respectively, in which focusing is performed by using the second lens unit.

In order to improve the autofocusing speed, it is useful to use a small and light lens unit composed of a small number of lenses as a focus lens unit. In addition, in order to reduce an amount of movement during focusing, it is useful to use a lens unit having a strong refractive power as a focus lens unit. In general, in the case where the focus lens unit is configured by using a small number of lenses, if the power (refractive power) of the focus lens unit is strengthened, the residual aberration of the focus lens unit increases, which is accordingly accompanied by variations in aberration due to focusing. Therefore, the power of the focus lens unit cannot be strengthened by an excessive amount.

On the other hand, if the power of the focus lens unit is weakened, the amount of movement during focusing is increased. As a result, the space where the focus lens unit is moved is increased, so that sufficient space where the zooming lens unit can be moved cannot be secured. Therefore, it is difficult to allow the entire zoom lens to be accommodated in a small size while maintaining high optical performance. In U.S. Patent Application Publication No. 2010/0091170, the third lens unit having a negative refractive power is configured as a focus lens unit, and in U.S. Patent Application Publication No. 2010/0091171, the third lens unit having a positive refractive power is configured as a focus lens unit.

In these zoom lenses, to allow the amount of movement of the focus lens unit to be decreased, the negative power of the second lens unit in U.S. Patent Application Publication No. 2010/0091170 or the positive power of the fourth lens unit in U.S. Patent Application Publication No. 2010/0091171 is weakened to a degree that the power of the focus lens unit is strengthened. Therefore, in U.S. Patent Application Publication No. 2010/0091170, in the case where a composite lens unit of the second lens unit and the third lens unit is configured as a lens unit having a negative refractive power, the principal point position is greatly shifted to the image side with respect to the second lens unit having a negative refractive power. In addition, in U.S. Patent Application Publication No. 2010/0091171, in the case where a composite lens unit of the third lens unit and the fourth lens unit is configured as a lens unit having a positive refractive power, the principal point position is greatly shifted to the object side with respect to the third lens unit having a positive refractive power.

As a result, it is difficult to appropriately set the power of each lens unit for correcting the variation of aberration during zooming, so that there is a tendency that it is difficult to implement high performance and to allow the entire zoom lens to have a small size.

SUMMARY OF THE INVENTION

According to an aspect of the present invention, a zoom lens includes an aperture stop and a plurality of lens units which are moved during zooming, wherein the plurality of lens units includes, on an object side of the aperture stop, a positive lens unit Lp having a positive refractive power and a negative lens unit Ln having a negative refractive power which is disposed to be adjacent to an image side of the positive lens unit Lp, wherein at least one of the positive lens unit Lp and the negative lens unit Ln includes two or less lenses which are moved during focusing, and wherein, when focal lengths of the positive and negative lens units Lp and Ln are denoted by Fp and Fn, respectively, the following condition is satisfied:

$$0.5 < |Fp/Fn| < 2.0.$$

Another aspect of the present invention is directed to an image pickup apparatus equipped with the zoom lens. Advantageously, the zoom lens is designed to have small size, light weight, and at a predetermined optical power, it is capable of performing focusing at a high speed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a cross-sectional view illustrating a zoom lens at a wide-angle end according to a first exemplary embodiment of the present invention.

FIGS. 2A and 2B are aberration graphs at a wide-angle end and a telephoto end of the zoom lens according to the first exemplary embodiment when the zoom lens focuses on an infinitely distant object.

FIGS. 3A and 3B are aberration graphs at a wide-angle end and a telephoto end of the zoom lens according to the first exemplary embodiment, which is represented in units of mm, when the zoom lens focuses on an object at an object distance of 420 mm.

FIG. 4 is a cross-sectional view illustrating a zoom lens at a wide-angle end according to a second exemplary embodiment of the present invention.

FIGS. 5A and 5B are aberration graphs at a wide-angle end and a telephoto end of the zoom lens according to the second exemplary embodiment when the zoom lens focuses on an infinitely distant object.

FIGS. 6A and 6B are aberration graphs at a wide-angle end and a telephoto end of the zoom lens according to the second exemplary embodiment, which is represented in units of mm, when the zoom lens focuses on an object at an object distance of 300 mm FIG. 7 is a cross-sectional view illustrating a zoom lens at a wide-angle end according to a third exemplary embodiment of the present invention.

FIGS. 8A and 8B are aberration graphs at a wide-angle end and a telephoto end of the zoom lens according to the third exemplary embodiment when the zoom lens focuses on an infinitely distant object.

FIGS. 9A and 9B are aberration graphs at a wide-angle end and a telephoto end of the zoom lens according to the third exemplary embodiment, which is represented in units of mm, when the zoom lens focuses on an object at an object distance of 390 mm FIG. 10 is a cross-sectional view illustrating a zoom lens at a wide-angle end according to a fourth exemplary embodiment of the present invention.

FIGS. 11A and 11B are aberration graphs at a wide-angle end and a telephoto end of the zoom lens according to the fourth exemplary embodiment when the zoom lens focuses on an infinitely distant object.

FIGS. 12A and 12B are aberration graphs at a wide-angle end and a telephoto end of the zoom lens according to the fourth exemplary embodiment, which is represented in units of mm, when the zoom lens focuses on an object at an object distance of 420 mm.

FIGS. 15A and 15B are aberration graphs at a wide-angle end and a telephoto end of the zoom lens according to the fifth exemplary embodiment, which is represented in units of mm, when the zoom lens focuses on an object at an object distance of 420 mm.

FIGS. 17A and 17B are aberration graphs at a wide-angle end and a telephoto end of the zoom lens according to the sixth exemplary embodiment when the zoom lens focuses on an infinitely distant object.

FIGS. 18A and 18B are aberration graphs at a wide-angle end and a telephoto end of the zoom lens according to the sixth exemplary embodiment, which is represented in units of mm, when the zoom lens focuses on an object at an object distance of 420 mm.

DESCRIPTION OF THE EMBODIMENTS

Various exemplary embodiments, features, and aspects of the invention will be described in detail below with reference to the drawings.

A zoom lens according to an exemplary embodiment of the present invention includes an aperture stop and a plurality of lens units which are moved during focusing. On an object side of the aperture stop SP, a positive lens unit Lp having a positive refractive power and a negative lens unit Ln having a negative refractive power which is adjacent to an image side of the positive lens unit Lp are included. At least one lens unit thereof includes two or less lenses which are moved during focusing.

FIG. 1 is a lens cross-sectional view illustrating a zoom lens at a wide-angle end (short focal length end) according to a first exemplary embodiment of the present invention. FIGS. 2A and 2B are aberration graphs at a wide-angle end and a telephoto end (long focal length end) of the zoom lens according to the first exemplary embodiment when the zoom lens focuses on an infinitely distant object. FIGS. 3A and 3B are aberration graphs at a wide-angle end and a telephoto end of the zoom lens according to the first exemplary embodiment when the zoom focuses on a near distance object (photographing distance: 420 mm).

Figure 5A:
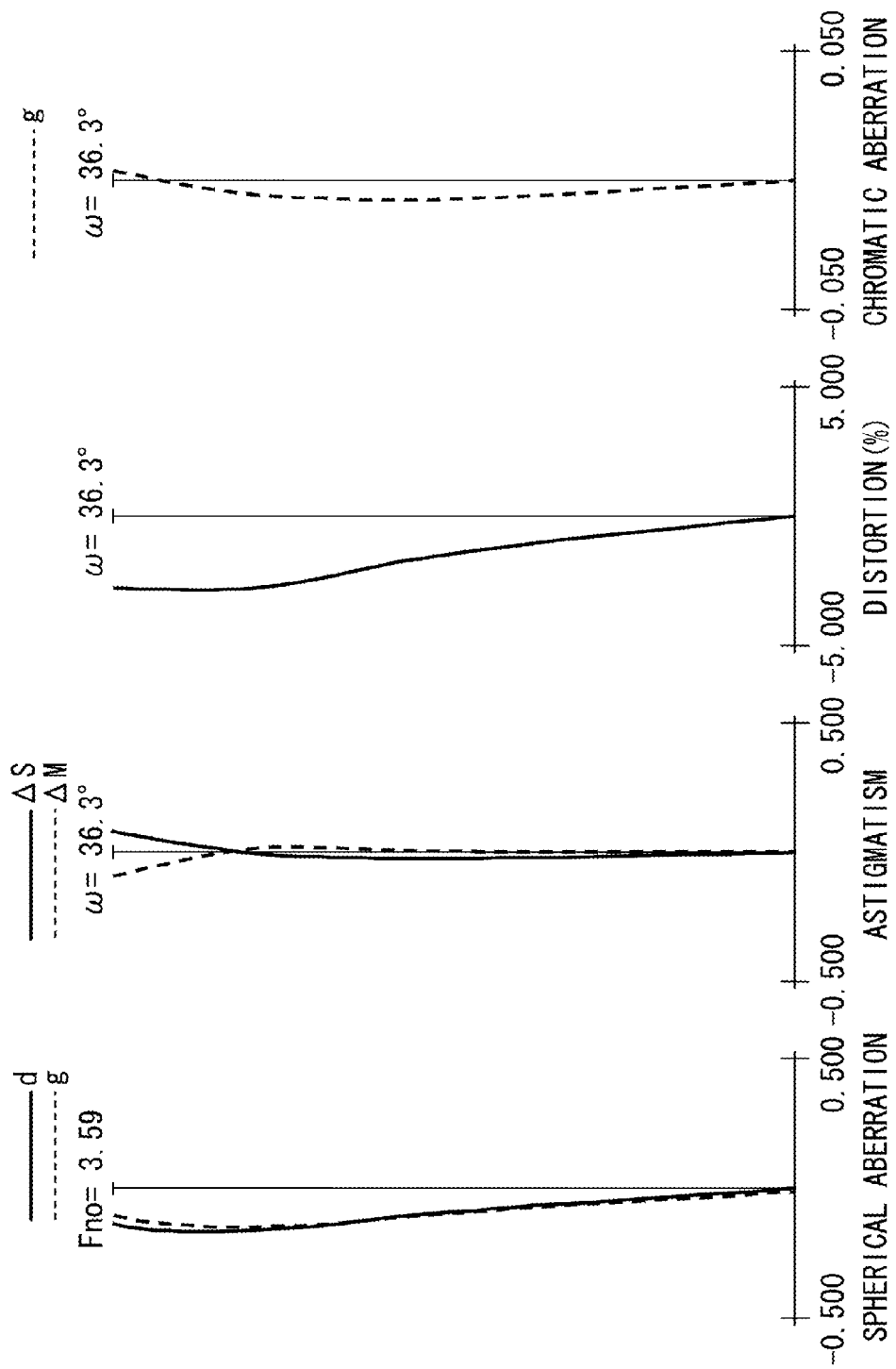

FIG. 4 is a lens cross-sectional view illustrating a zoom lens at a wide-angle end according to a second exemplary embodiment of the present invention. FIGS. 5A and 5B are aberration graphs at a wide-angle end and a telephoto end of the zoom lens according to the second exemplary embodiment when the zoom lens focuses on an infinitely distant object. FIGS. 6A and 6B are aberration graphs at a wide-angle end and a telephoto end of the zoom lens according to the second exemplary embodiment when the zoom focuses on a near distance object (photographing distance: 300 mm).

Figure 9B:
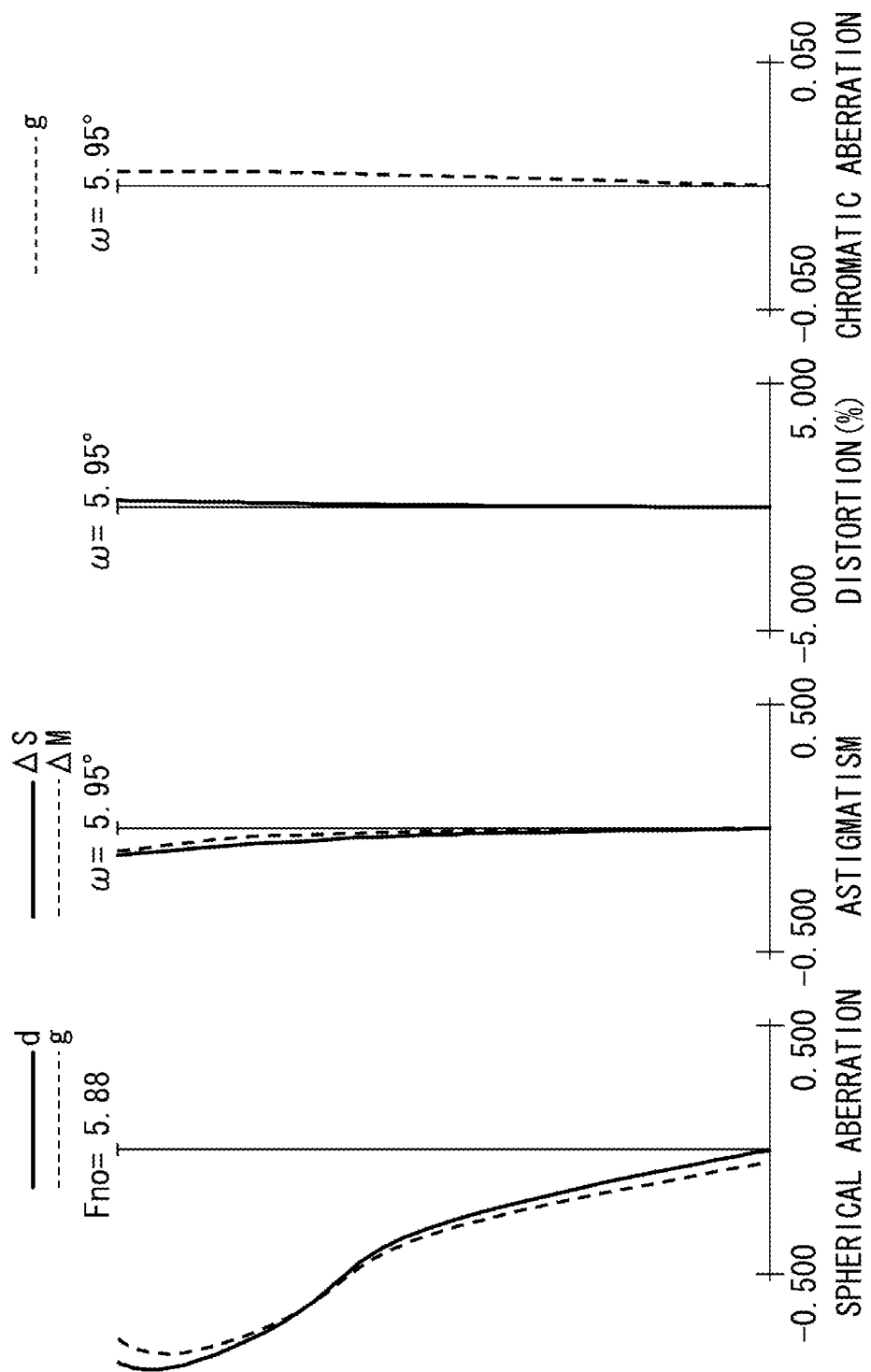

FIG. 7 is a lens cross-sectional view illustrating a zoom lens at a wide-angle end according to a third exemplary embodiment of the present invention. FIGS. 8A and 8B are aberration graphs at a wide-angle end and a telephoto end of the zoom lens according to the third exemplary embodiment when the zoom lens focuses on an infinitely distant object. FIGS. 9A and 9B are aberration graphs at a wide-angle end and a telephoto end of the zoom lens according to the third exemplary embodiment when the zoom lens focuses on a near distance object (photographing distance: 390 mm).

FIG. 10 is a lens cross-sectional view illustrating a zoom lens at a wide-angle end according to a fourth exemplary embodiment of the present invention. FIGS. 11A and 11B are aberration graphs at a wide-angle end and a telephoto end of the zoom lens according to the fourth exemplary embodiment when the zoom lens focuses on an infinitely distant object. FIGS. 12A and 12B are aberration graphs at a wide-angle end and a telephoto end of the zoom lens according to the fourth exemplary embodiment when the zoom lens focuses on a near distance object (photographing distance: 420 mm).

Figure 13:
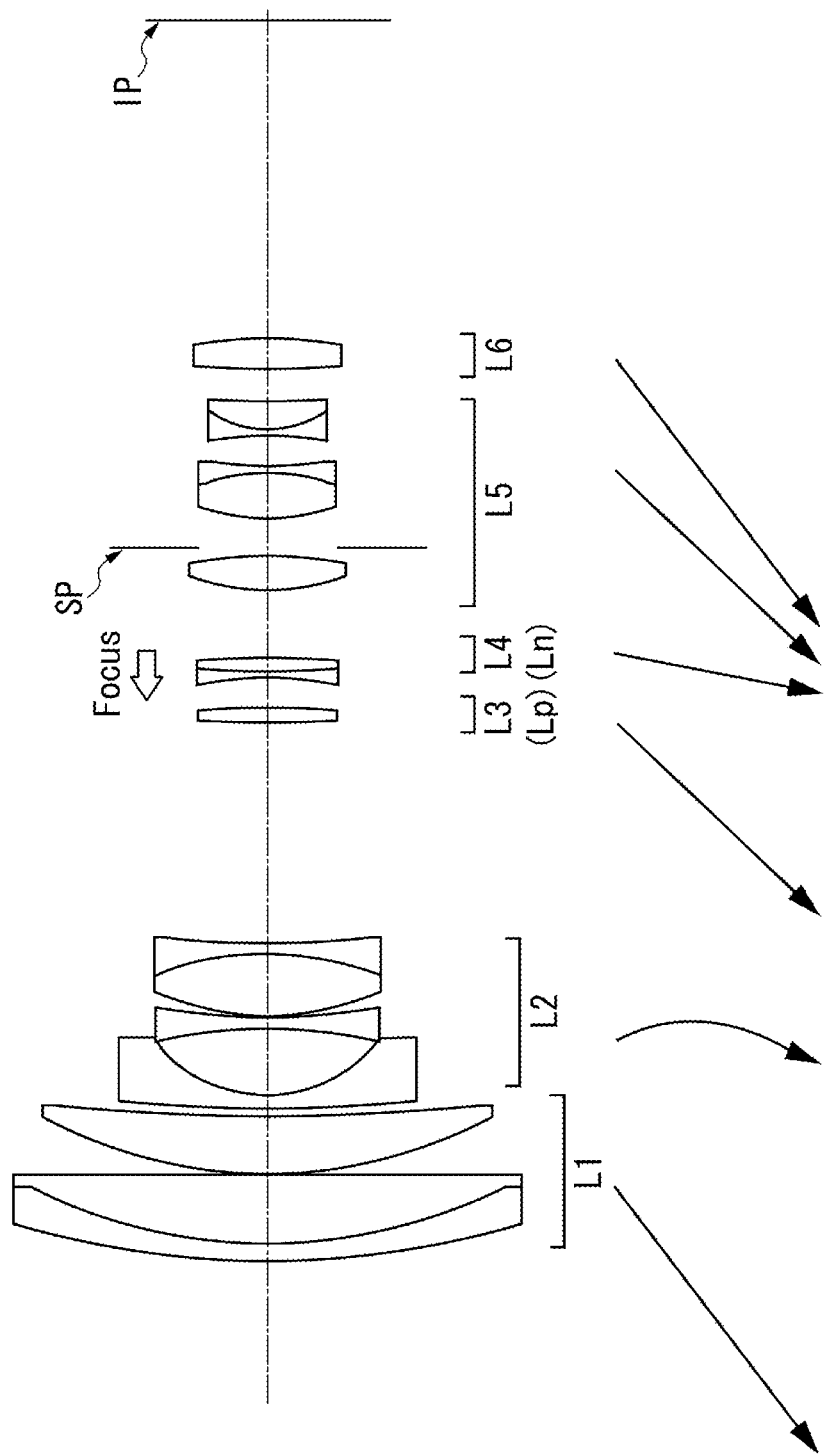
FIG. 13 is a cross-sectional view illustrating a zoom lens at a wide-angle end according to a fifth exemplary embodiment of the present invention.
Figure 14A:
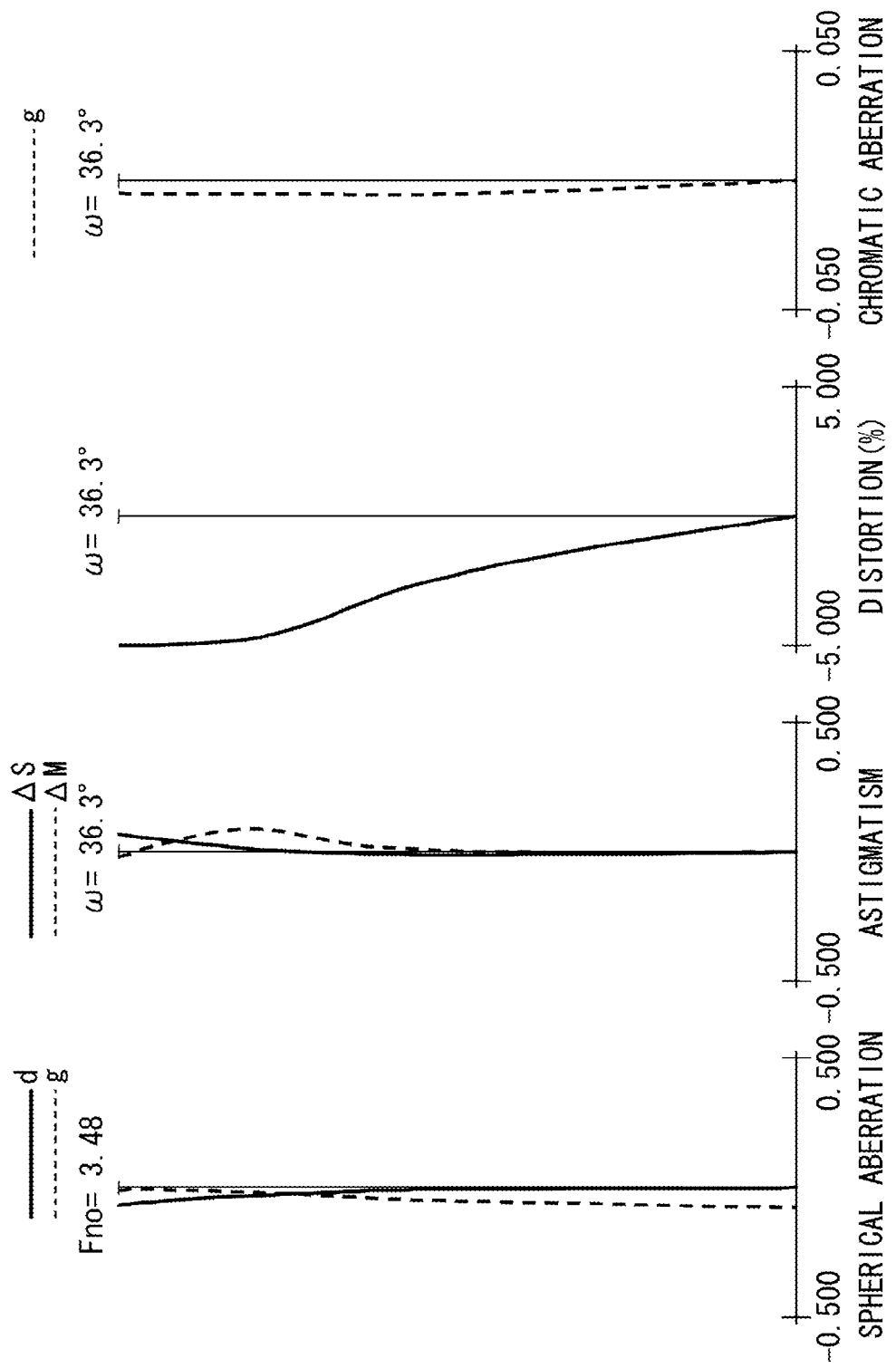
FIGS. 14A and 14B are aberration graphs at a wide-angle end and a telephoto end of the zoom lens according to the fifth exemplary embodiment when the zoom lens focuses on an infinitely distant object.
Figure 14B:
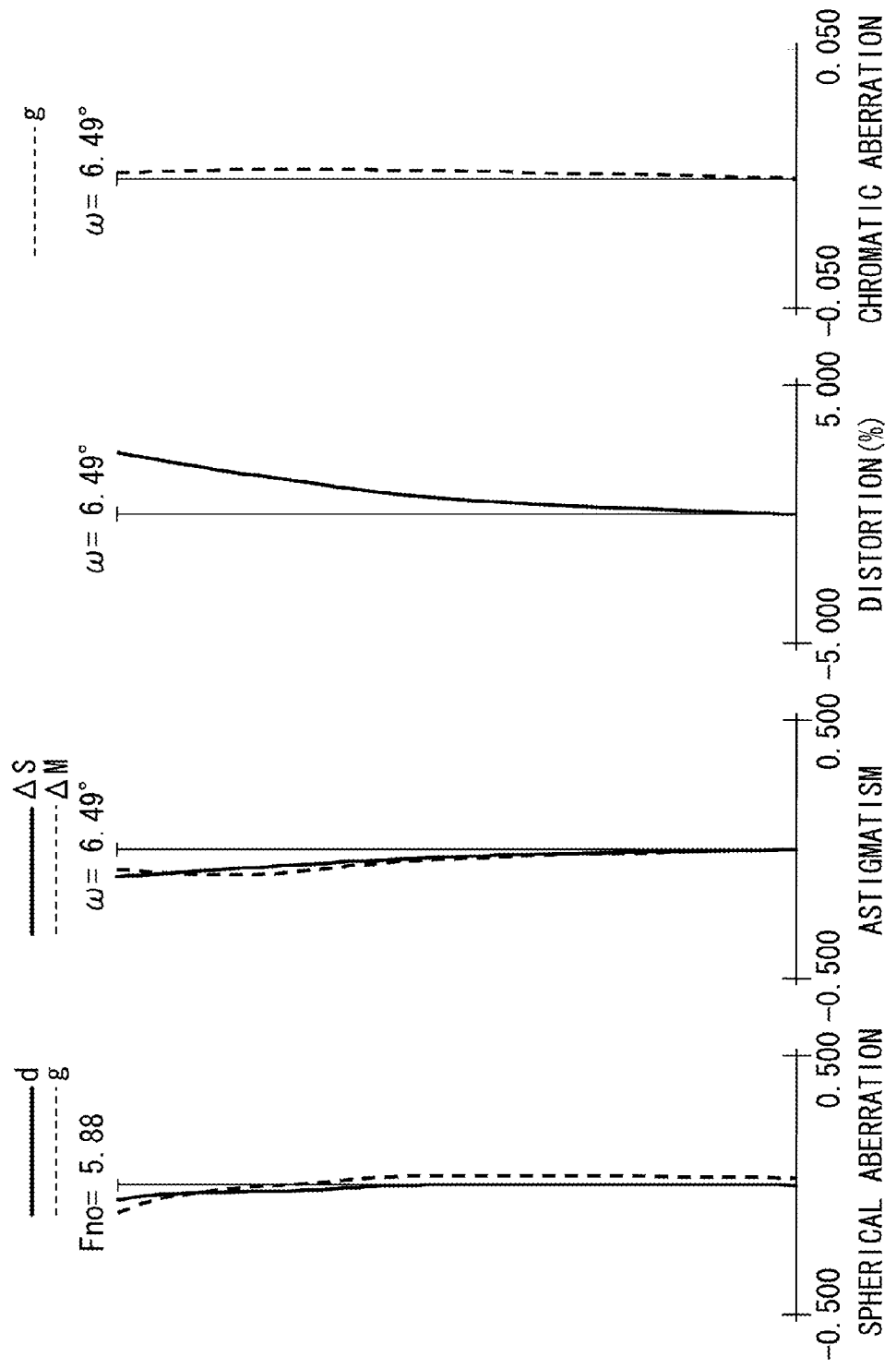

FIG. 13 is a lens cross-sectional view illustrating a zoom lens at a wide-angle end according to a fifth exemplary embodiment of the present invention. FIGS. 14A and 14B are aberration graphs at a wide-angle end and a telephoto end of the zoom lens according to the fifth exemplary embodiment when the zoom lens focuses on an infinitely distant object. FIGS. 15A and 15B are aberration graphs at a wide-angle end and a telephoto end of the zoom lens according to the fifth exemplary embodiment when the zoom lens focuses on a near distance object (photographing distance: 420 mm).

Figure 16:
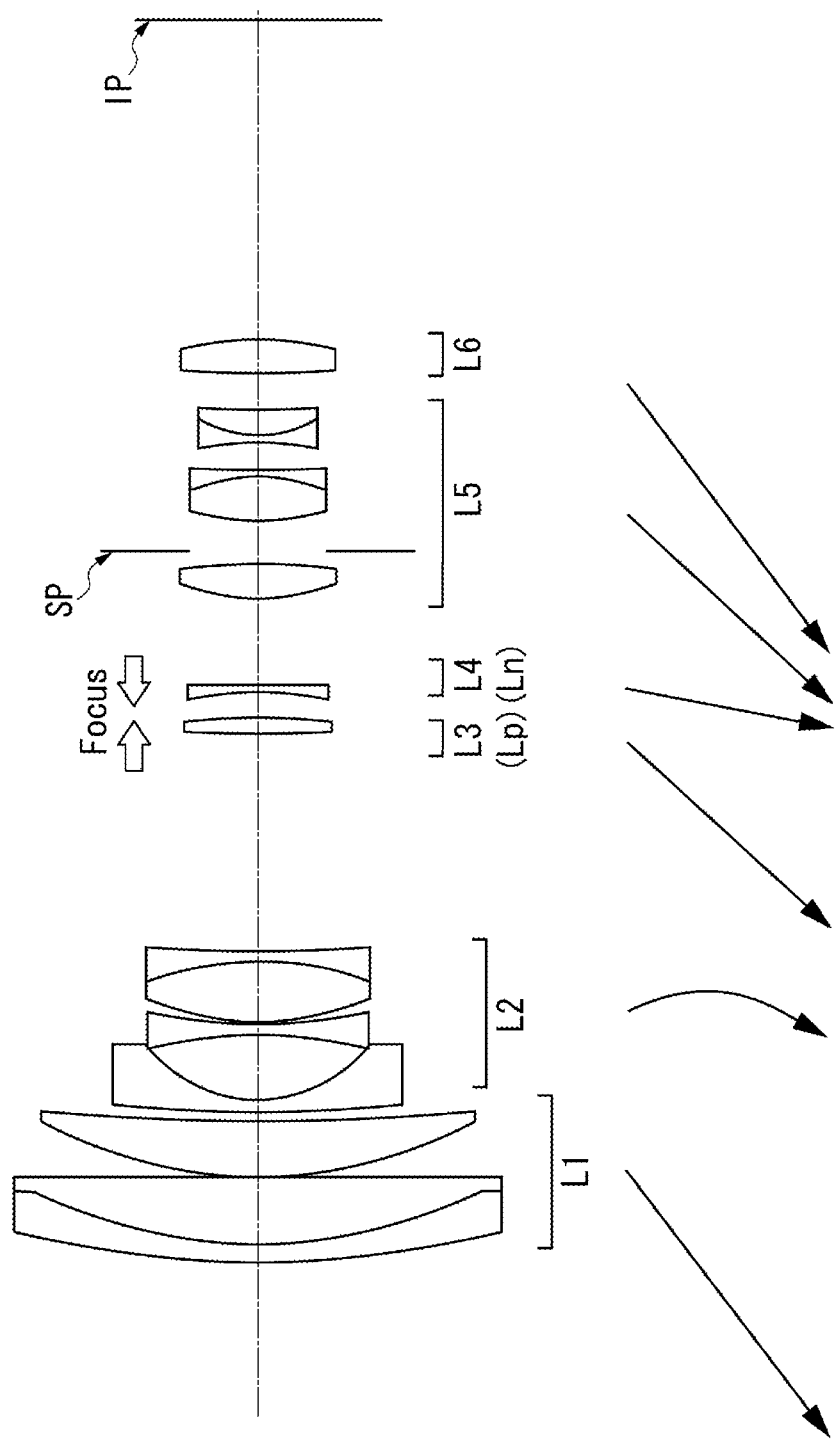
FIG. 16 is a cross-sectional view illustrating a zoom lens at a wide-angle end according to a sixth exemplary embodiment of the present invention.
Figure 18B:
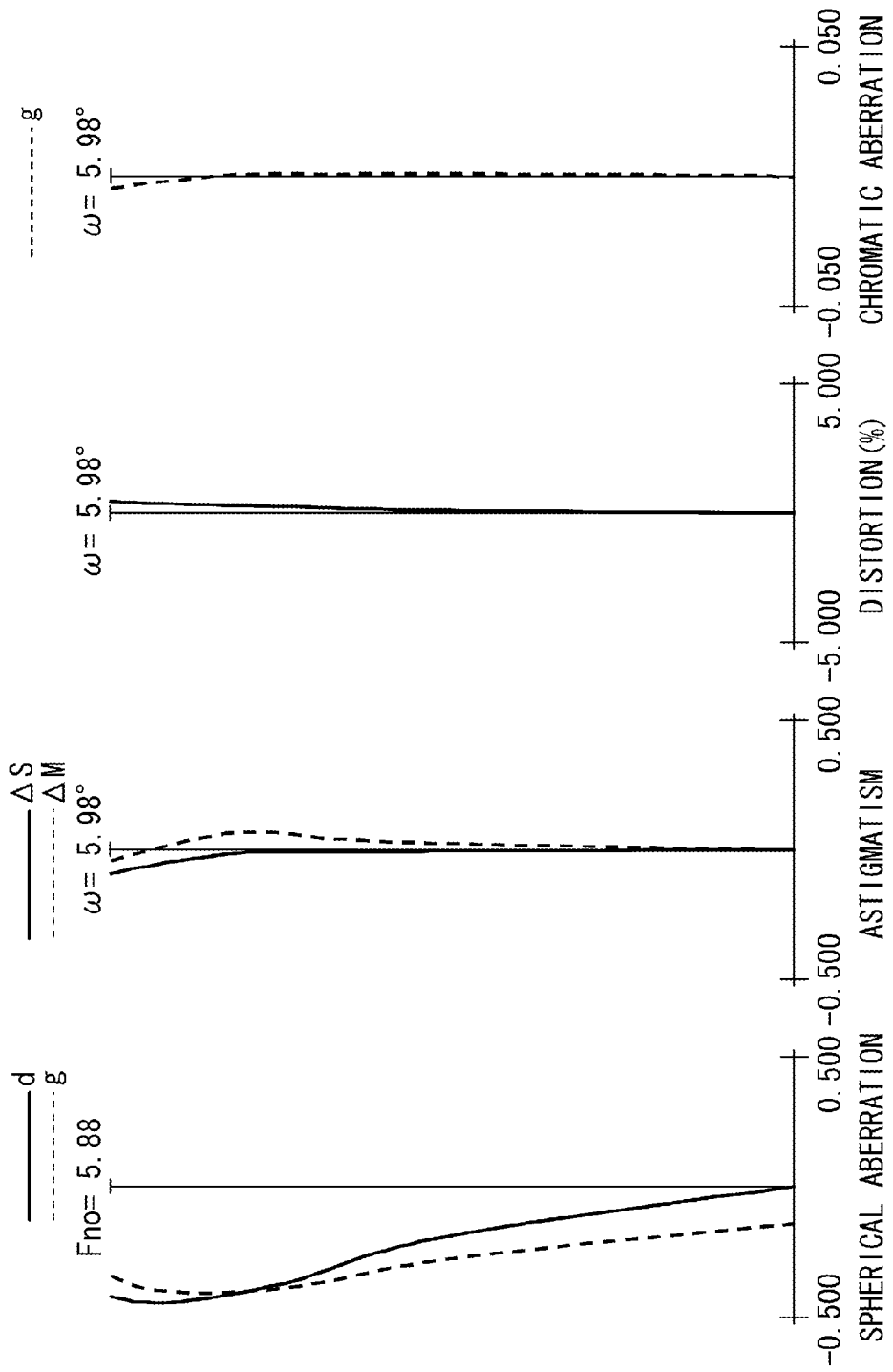
Figure 19:
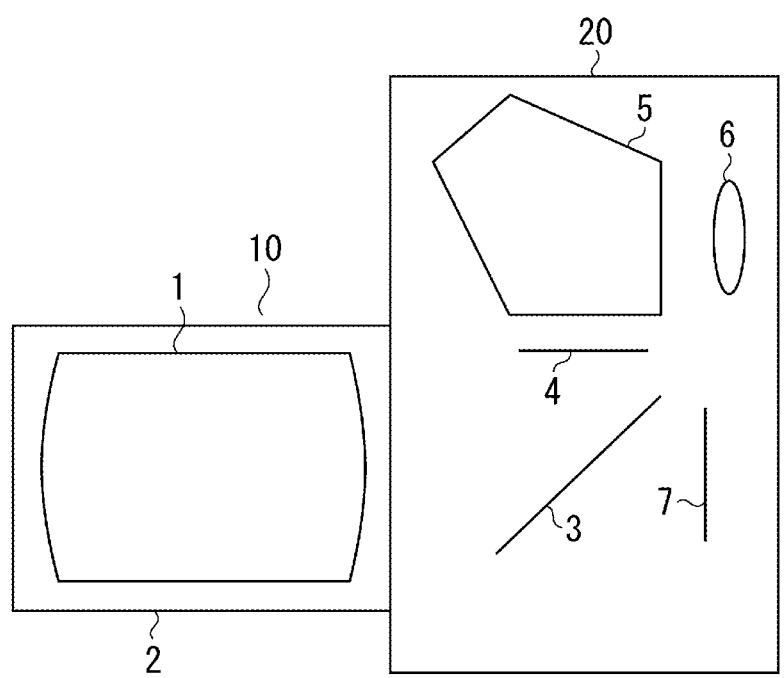
FIG. 19 is a schematic diagram illustrating main components of an image pickup apparatus according to an exemplary embodiment of the present invention.

FIG. 16 is a lens cross-sectional view illustrating a zoom lens at a wide-angle end according to a sixth exemplary embodiment of the present invention. FIGS. 17A and 17B are aberration graphs at a wide-angle end and a telephoto end of the zoom lens according to the sixth exemplary embodiment when the zoom lens focuses on an infinitely distant object. FIGS. 18A and 18B are aberration graphs at a wide-angle end and a telephoto end of the zoom lens according to the sixth exemplary embodiment when the zoom lens focuses on a near distance object (photographing distance: 420 mm). FIG. 19 is a schematic diagram illustrating main components of a single-lens reflex camera (image pickup apparatus) including a zoom lens according to an exemplary embodiment of the present invention.

The zoom lens according to each exemplary embodiment is a photographic lens system (optical system) used for an image pickup apparatus such as a video camera, a digital camera, or a silver-halide film camera. In each cross-sectional view, the left side is the object side (front side), and the right side is the image side (rear side) of the zoom lens. In each cross-sectional view, reference index "i" represents the order of a lens unit seen from the object side to the image side. Accordingly, reference numeral "Li" represents the i-th lens unit. Reference numeral "SP" represents an aperture stop. Reference numeral "IP" represents an image plane. The image plane IP corresponds to an imaging surface of a solid-state image sensor (photoelectric conversion element), such as a charge-coupled device (CCD) sensor or a complementary metal-oxide semiconductor (CMOS) sensor in the case where the zoom lens is used as a photographic optical system of a video camera or a digital still camera. In addition, the image plane IP corresponds to a film surface when the zoom lens is used for a silver-halide film camera.

Each arrow indicates a moving locus of each lens unit during zooming from a wide-angle end to a telephoto end. In each spherical aberration graph, spherical aberrations with respect to the Fraunhofer d-line and g-line are indicated by a solid line and a broken line, respectively. In each astigmatism graph, a broken line indicates a deviation amount ΔM of the meridional image surface with respect to d-line, and a solid line indicates a deviation amount ΔS of the sagittal image surface with respect to d-line. In addition, in each distortion graph, distortion with respect to d-line is illustrated. Chromatic aberration graphs represent chromatic aberration of magnification with respect to the g-line. Reference character "Fno" represents an F-number, and reference character "ω" represents a half angle of view. In each exemplary embodiment hereinafter described, the wide-angle end and the telephoto end respectively denote zoom positions when a magnification varying lens unit, when the lens unit is located at a respective mechanical end of a movable range on an optical axis.

To better illustrate the advantages of the zoom lens disclosed in the various embodiments disclosed herein, a discussion of notable differences between the zoom lens according to an exemplary embodiment of the present invention and a zoom lens in the related art will be described. As discussed in U.S. Patent Application Publication No. 2011/0116174, in the four-unit zoom lens where focusing is performed by the entire second lens unit, the focus lens unit has a very large size. On the contrary, it is easy to strengthen the power of the lens unit which is moved during focusing, and it is possible to reduce the range of movement, so that there is an advantage of allowing the entire zoom lens to have a small size.

On the other hand, in the zoom lens where the focus lens unit is configured by using a small number of lenses, if the power of the focus lens unit is strengthened too much, the remaining aberration of the focus lens unit is increased. Therefore, the variation of aberration due to a change in the object distance is greatly increased. For this reason, if the miniaturization of the focus lens unit and the reduction of the variation of aberration according to the change of the object distance are simultaneously intended, a focus moving amount is increased, so that a space where the lens unit moves for zooming is decreased.

In addition, in the zoom lens discussed in U.S. Patent Application Publication No. 2010/0091170, if the suppression of the focus moving amount is intended by strengthening the power of the third lens unit, which is a focus lens unit, a front principal point position of a composite lens unit having a negative refractive power of the second and third lens units is moved to the third lens unit side. This denotes that, at the wide-angle end of the four-unit zoom lens including lens units having positive, negative, positive, and positive refractive powers, the distance between the first lens unit and the second lens unit, as a variator, is widened. Therefore, it is very difficult to widen the angle of view.

In addition, in U.S. Patent Application Publication No. 2010/0091170, the third lens unit, which is a focus lens unit, is moved to the second lens unit side at the wide-angle end and to the fourth lens unit side at the telephoto end during zooming to narrow the distance. Therefore, the effect of variation of magnification is obtained. However, the distance between the second lens unit and the third lens unit needs to be secured in proportion to an amount of movement of the focus lens unit. Therefore, the movement of the second lens unit toward the fourth lens unit side is limited. Thus, in comparison with the four-unit zoom lens described above, the effect of variation of magnification is considerably diminished.

In the zoom lens discussed in U.S. Patent Application Publication No. 2010/0091171, the positive power (refractive power) of the fourth lens unit is distributed to the third lens unit side, which is a focus lens unit. Therefore, the principal point positions of the third and fourth lens units are moved to the third lens unit side, so that it is difficult to secure a long back focus at the wide-angle end. In addition, during zooming from the wide-angle end to the telephoto end, third lens unit becomes close to the second lens unit side. Therefore, the fourth lens unit cannot become close to the second lens unit side in proportion to the amount of movement of the third lens unit, which is a focus lens unit. Thus, in comparison with the four-unit zoom lens described above, the effect of variation of magnification is lost.

Therefore, as described above, a zoom lens according to an exemplary embodiment of the present invention uses a focusing method where a composite lens unit including the positive lens unit Lp and the negative lens unit Ln is inserted in the optical path, and focusing is performed by using one or both of the lens units thereof. Advantageously, the composite lens unit including the positive lens unit Lp and the negative lens unit Ln has a substantially non-power. As used herein, the term "substantially non-power" means that the composite lens unit as a whole has substantially no optical power; that is, the combination of the optical power of the lens unit Lp and the lens unit Ln results in substantially zero optical power. Therefore, it is possible to correct aberration due to zooming without influence to the power arrangement of the original zoom lens unit. In addition, both of the powers of the positive lens unit Lp and the negative lens unit Ln are strengthened, so that it is possible to reduce the amount of movement of the focus lens unit under the state that the non-power of the composite lens unit is maintained.

In addition, the positive lens unit Lp and the negative lens unit Ln are disposed in this order from the object side within the diverging light flux on the object side of the aperture stop. Therefore, the positive lens unit Lp and the negative lens unit Ln are allowed to have an afocal relationship therebetween, so that it is possible to reduce the change of the axial light beam height during focusing. In addition, the positive lens unit Lp and the negative lens unit Ln are consecutively disposed, and the off-axis chief light beam height at the positions of the lens units also become close to each other, so that the off-axis aberrations occurring therebetween are allowed to effectively cancel each other. In contrast, in U.S. Pat. No. 7,184,221, the negative lens unit and the positive lens unit are disposed in this order from the object side to the image side within a converging light flux on the image side of the aperture stop, and focusing is performed by using the negative lens unit.

In the focusing method described herein, the negative lens unit and the positive lens unit are allowed to have an afocal relationship therebetween, so that it is possible to reduce the change of the axial light beam height due to focusing. However, originally, at the wide-angle end, a negative power is disposed on the object side, and a strong positive power is disposed on the image side. Therefore, although the widening of the angle of view, the miniaturization of the entire zoom lens, and the implementation of high performance are intended by effectively disposing the rear principal point, in U.S. Pat. No. 7,184,221, since the a strong negative lens unit is disposed on the image side, the entire zoom lens is enlarged.

In addition, in U.S. Pat. No. 7,184,221, an off-axis chief light beam height is increased by the negative lens unit having a strong refractive power on the image side of the aperture stop. As a result, when the negative lens unit is moved during focusing, the off-axis chief light beam height passing through the positive lens unit on the image side is greatly changed, so that the change in the object distance of the off-axis aberration is also increased.

In a zoom lens according to an exemplary embodiment of the present invention, during zooming from the wide-angle end to the telephoto end, the positive lens unit Lp having a positive refractive power and the negative lens unit Ln having a negative refractive power are moved to increase the distance therebetween, so that the effect of the variation of magnification can be obtained. In addition, it is utilized for the variation of magnification without waste of the space for driving during focusing of the focus lens unit. Accordingly, it is possible to implement a small-sized, light-weight focusing mechanism, to obtain good optical performance over the entire zoom range and the entire focus range, and to miniaturize the entire zoom lens.

Next, features of a zoom lens according to an exemplary embodiment of the present invention will be described. A zoom lens according to each exemplary embodiment includes an aperture stop SP and a plurality of lens units which are moved during focusing. In addition, on an object side of the aperture stop SP, a positive lens unit Lp having a positive refractive power and a negative lens unit Ln having a negative refractive power which is adjacent to an image side of the positive lens unit Lp are included. At least one lens unit thereof is moved for focusing. In each exemplary embodiment, a focal length of the positive lens unit Lp and a focal length of the negative lens unit Ln are indicated by Fp and Fn, respectively. In this case, the following condition is satisfied:

$$0.5 < |Fp/Fn| < 2.0 \quad (1)$$

The condition (1) relates to the ratio of the focal length of the positive lens unit Lp to the focal length of the negative lens unit Ln. The positive lens unit Lp and the negative lens unit Ln are disposed in this order from the object side to the image side on the object side of the aperture stop where the axial light beam diverges, so that the axial light beam passing between the lens units is configured to be in an afocal state. Therefore, it is possible to reduce the variation of the axial light beam height due to focusing. In addition, the positive lens unit Lp and the negative lens unit Ln are consecutively disposed, and the off-axis chief light beam heights at the positions of the lens units also become close to each other, so that off-axis aberrations occurring therebetween are allowed to effectively cancel each other.

In addition, since the positive lens unit Lp and the negative lens unit Ln constitute a pair of positive and negative refractive powers, the composite power thereof can be maintained to be a substantially non-power or a non-power, and the mutual power can be strengthened. Accordingly, it is possible to reduce the focus moving amount during focusing at least one of the lens units. Therefore, although the positive lens unit Lp or the negative lens unit Ln includes a small number (two or less) of lenses, it is possible to reduce the focus moving amount, to improve the effect of the variation of magnification during zooming, and to reduce the variation of aberration due to focusing.

If the range of the condition (1) is exceeded, the relationship of aberration cancellation between the lens units is lost, the variation of aberration due to focusing is increased, and the power arrangement (refractive power arrangement) of the other lens units is lost, so that the variation of aberration during zooming is increased. More usefully, the numerical range of the condition (1) may be defined as follows:

$$0.6 < |Fp/Fn| < 1.7 \quad (1a)$$

With respect to the zoom lens of each exemplary embodiment, it is more useful that at least one of the following conditions be satisfied. Lateral magnifications of the negative lens unit Ln at the wide-angle end and the telephoto end are denoted by $\beta nw$ and $\beta nt$, respectively. Lateral magnifications of the positive lens unit Lp at the wide-angle end and the telephoto end are denoted by $\beta pw$ and $\beta pt$, respectively. Composite focal lengths of lens units disposed on the object side of the positive lens unit Lp at the wide-angle end and the telephoto end are denoted by Ffw and Fft, respectively. Composite focal lengths of lens units disposed on the image side of the negative lens unit Ln at the wide-angle end and the telephoto end are denoted by Frw and Frt, respectively.

A distance from a most image-side surface of the negative lens unit Ln to an image plane (distance) is denoted by Dnw, and a focal length of the entire zoom lens at the wide-angle end is denoted by fw. An amount of movement of one lens unit, which is moved during focusing, among the positive lens unit Lp and the negative lens unit Ln at the telephoto end during focusing is denoted by Mft (the amount of movement from the object side to the image side is defined to be positive). An amount of relative movement of the one lens unit, which is moved during focusing, with respect to the other lens unit during zooming from the wide-angle end to the telephoto end is denoted by Mz (the amount of movement from the object side to the image side is defined to be positive). In this case, it is useful that at least one of the following conditions be satisfied:

$$|\beta nw|<1.0 \quad (2)$$

$$|\beta nt|<1.0 \quad (3)$$

$$0.3<|Ffw/Fp|<2.0 \quad (4)$$

$$0.3<|Fft/Fp|<2.0 \quad (5)$$

$$0.5<\beta pw\times\beta nw<1.6 \quad (6)$$

$$0.5<\beta pt\times\beta nt<1.6 \quad (7)$$

$$0.4<|Frw/Fn|<0.95 \quad (8)$$

$$0.4<|Frt/Fn|<0.95 \quad (9)$$

$$2.5<Dnw/fw<6.0 \quad (10)$$

$$0.3<|Mz/Mft|<1.0 \quad (11)$$

Next, technical meaning of each of the aforementioned conditions will be described.

The condition (2) relates to a wide-angle end lateral magnification the negative lens unit Ln. The condition (2) is to reduce the variation of axial aberration during focusing by allowing the positive lens unit Lp and the negative lens unit Ln to be close to each other in an afocal state. If the range of the condition (2) is exceeded, an afocality between the positive lens unit Lp and the negative lens unit Ln is lost, and an axial light beam height is greatly changed during focusing, so that the variation of spherical aberration or axial chromatic aberration is increased. More usefully, the numerical range of the condition (2) may be defined as follows:

$$|\beta nw|<0.5 \quad (2a)$$

In addition, at the telephoto end similarly to the wide-angle end, it is useful that the negative lens unit Ln satisfy the condition (3).

$$|\beta nt|<1.0 \quad (3)$$

The condition (3) relates to a telephoto end lateral magnification of the negative lens unit. The condition (3) is to reduce the variation of axial aberration during focusing by allowing the positive lens unit Lp and the negative lens unit Ln to be close to each other in an afocal state at the telephoto end as well as the wide-angle end. More usefully, the numerical range of the condition (3) may be defined as follows:

$$|\beta nt|<0.5 \quad (3a)$$

Next, conditions of each lens unit for allowing the positive lens unit Lp and the negative lens unit Ln to have an afocal relationship therebetween will be described. A wide-angle end composite focal length of lens units disposed on the image side of the negative lens unit Ln may be defined to be positive, and a wide-angle end composite focal length of lens units disposed on the object side of the positive lens unit Lp may be defined to be negative. Therefore, at the wide-angle end, the positive lens unit Lp and the negative lens unit Ln can be disposed within the diverging light flux, so that it is possible to easily allow the two lens units to effectively be close to each other afocally.

In addition, similarly, a telephoto end composite focal length of lens units disposed on the image side of the negative lens unit Ln may be defined to be positive, and a telephoto end composite focal length of lens units disposed on the object side of the positive lens unit Lp may be defined to be negative. Therefore, similarly to the wide-angle end, at the telephoto end, the positive lens unit Lp and negative lens unit Ln can also be disposed within the diverging light flux, so that it is possible to easily allow the two lens units to effectively have an afocal relationship therebetween.

Next, a relationship between the powers of the lens units for more effectively allowing the positive lens unit Lp and the negative lens unit Ln to have an afocal relationship therebetween and miniaturizing the entire zoom lens will be described. At the wide-angle end and the telephoto end, the conditions (4) and (5) may be satisfied, respectively. The conditions (4) and (5) relate to wide-angle end and telephoto end composite focal lengths of lens units on the object side of the positive lens unit Lp, respectively. If the upper limits of the conditions (4) and (5) are exceeded, the light flux of the image side from the positive lens unit Lp becomes a converging light flux. In addition, if the lower limits thereof are exceeded, the light flux of the image side from the positive lens unit Lp becomes a diverging light flux. As a result, the axial light beam height is changed during focusing, so that the variation of spherical aberration or axial chromatic aberration is greatly increased.

More usefully, the numerical ranges of the conditions (4) and (5) may be defined as follows:

$$0.35<|Ffw/Fp|<1.7 \quad (4a)$$

$$0.35<|Fft/Fp|<1.7 \quad (5a)$$

The condition (6) relates to a product of wide-angle end lateral magnifications of the positive lens unit Lp and the negative lens unit Ln. The condition (6) is to easily correct aberration by using the other lens unit by allowing the change of the magnification of a composite lens unit of the positive lens unit Lp and the negative lens unit Ln to be decreased. If the upper limit of the condition (6) is exceeded, the positive power of the composite lens unit of the positive lens unit Lp and the negative lens unit Ln is strengthened. As a result, a positive principal point position of the composite lens unit located on the image side of the negative lens unit Ln is moved toward the object side, so that it is difficult to obtain a predetermined length of the back focus.

If the lower limit of the condition (6) is exceeded, the negative power of the composite lens unit of the positive lens unit Lp and the negative lens unit Ln is strengthened. As a result, a negative principal point position of the composite lens unit located on the object side of positive lens unit Lp is moved to the image side, so that it is difficult to widen the angle of view. More usefully, the numerical range of the condition (6) may be defined as follows:

$$0.6<\beta pw\times\beta nw<1.5 \quad (6a)$$

In addition, it is useful that the positive lens unit Lp and the negative lens unit Ln satisfy the condition (7) at the telephoto end as well as the wide-angle end.

$$0.5 < \beta pt \times \beta nt < 1.6 \tag{7}$$

The condition (7) relates to a product of wide-angle end lateral magnifications of the positive lens unit and the negative lens unit.

The condition (7) is to easily correct aberration by using the other lens unit by allowing the change of magnification of a composite lens unit of the positive lens unit Lp and the negative lens unit Ln to be decreased at the telephoto end as well as the wide-angle end. More usefully, the numerical range of the condition (7) may be defined as follows:

$$0.6 < \beta pt \times \beta nt < 1.5 \tag{7a}$$

The conditions (8) and (9) are to convert an afocal light flux into a diverging light flux by the negative lens unit Ln, and after that, to allow the light flux to effectively converge to the image plane gain. The conditions (8) and (9) relate to wide-angle end and telephoto end composite focal lengths of lens units on the image side of the negative lens unit Ln, respectively. The conditions (8) and (9) are conditions for allowing the entire zoom lens not to be enlarged and maintaining a good optical performance when the light flux which is allowed to diverge by the negative power of the negative lens unit Ln is focused on the image plane by the positive power, at the wide-angle end and the telephoto end, respectively.

If the upper limits of the conditions (8) and (9) are exceeded, the diverging power is too weak, so that the entire zoom lens is enlarged. If the lower limits thereof are exceeded, the diverging power is too strong, so that spherical aberration is increased. More usefully, the numerical ranges of the conditions (8) and (9) may be defined as follows:

$$0.5 < |Frw/Fn| < 0.9 \tag{8a}$$

$$0.5 < |Frt/Fn| < 0.9 \tag{9a}$$

The condition (10) is to miniaturize the entire zoom lens and to obtain high optical performance by appropriately setting the positions of the positive lens unit Lp and the negative lens unit Ln on the optical axis at the wide-angle end. In general, in order to widen the angle of view by reducing the focal length of the entire zoom lens and miniaturize the entire zoom lens, the most effective configuration is a retro-focus type configuration, in which a negative power (refractive power) is disposed on the object side and a positive power is disposed on the image side.

Therefore, it is useful that the negative lens unit Ln having a negative power be disposed at a position of the object side separated from the image plane at the wide-angle end. The condition (10) relates to a distance from a most-image-side lens surface of the negative lens unit Ln to the image plane at the wide-angle end. If the lower limit of the condition (10) is exceeded, the negative lens unit Ln becomes close to the image side, so that the retro-focus type power arrangement is lost. Therefore, it is difficult to widen the angle of view. If the upper limit of the condition (10) is exceeded, the total length is unnecessarily increased, which is not desirable. More usefully, the numerical range of the condition (10) may be defined as follows:

$$3.0 < Dnw/fw < 5.5 \tag{10a}$$

In the optical systems according to the exemplary embodiments, it is useful that only the one lens unit among the positive lens unit Lp and the negative lens unit Ln be moved during focusing since the driving mechanism can be simplified.

In addition, in this case, it is useful that the lens unit (the one lens unit) of which the absolute value of the power (refractive power) is large be moved during focusing and the lens unit be moved so that the relative position with respect to the other lens unit be changed during zooming. Accordingly, this configuration is useful since the space for the focus movement can be reduced, and the effect of the variation of magnification can be effective obtained. In addition, in this case, in order to miniaturize the entire zoom lens, it is useful that the lens unit (the other lens unit) which is not moved during focusing among the positive lens unit Lp and the negative lens unit Ln is also configured to include a small number (two or less) of lenses.

The condition (11) relates to the ratio of the telephoto end focus moving amount Mft of the lens unit of which the absolute value of the power is large to the amount Mz of relative movement of the lens unit of which the power is large with respect to the one lens unit from the wide-angle end to the telephoto end. Herein, the sign of the moving amount Mft and the sign of the amount Mz of relative movement are defined so that the movement from the object side to the image side is positive. If the upper limit of the condition (11) is exceeded, the distance between the positive lens unit Lp and the negative lens unit Ln is unnecessarily wide with respect to the telephoto end focusing driving amount, so that the entire zoom lens is enlarged.

If the lower limit of the condition (11) is exceeded, the amount of movement during zooming is decreased, and the load of variation of magnification in the lens units for the zooming is increased, so that it is difficult to obtain high optical performance. More usefully, the numerical range of the condition (11) may be defined as follows:

$$0.35 < |Mz/Mft| < 0.90 \tag{11a}$$

In addition, the lens units in each exemplary embodiment are as follows: The lens units denotes the lens units disposed in a range from the front lens surface of the optical system or the surface where the zooming together with the lens adjacent thereto in the forward direction is changed due to the variation of magnification or the focusing to the last lens surface of the optical system or the surface where the distance with respect to the lens adjacent thereto in the backward direction is changed during zooming or the focusing.

The present invention can be applied to various optical apparatuses (for example, an image pickup apparatus, an image projection apparatus, or others) having the zoom lens described above. Hereinafter, the lens configuration in each exemplary embodiment will be described.

The zoom lens according to the first exemplary embodiment includes a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power and including an aperture stop SP, and a sixth lens unit L6 having a positive refractive power. In addition, the zoom lens is configured so that, during zooming from a wide-angle end to a telephoto end, the first lens unit L1 and the third to sixth lens units L3 to L6 are moved to an object side, and the second lens unit L2 is moved with a locus that is convex toward an image side.

The zoom lens according to the first exemplary embodiment is a positive lead type six-unit zoom lens having a zoom ratio of 7.0. The third lens unit L3 corresponds to the positive lens unit Lp; the fourth lens unit L4 corresponds to the negative lens unit Ln; and focusing is performed by the negative lens unit Ln. The negative lens unit Ln includes one lens, so that it is possible to allow the focus lens unit to have a small size and light weight. In addition, the positive lens unit Lp is also configured by one positive lens, so that it is possible to allow the entire zoom lens to have a small size and light weight.

In addition, the positive lens unit Lp and the negative lens unit Ln satisfy the condition (1), so that the composite power (refractive power) is weakened. In addition, the conditions (6) and (7) are satisfied at the wide-angle end and the telephoto end, respectively, so that the change of the composite magnification is also decreased. Therefore, it is possible to obtain high performance without influence to the power arrangement of a different magnification varying lens unit. In addition, since the positive lens unit Lp and the negative lens unit Ln as a pair constitute a non-power lens unit (lens unit having a refractive power of zero), both of the powers of the positive lens unit Lp and the negative lens unit Ln can be strengthened, so that a focus driving amount of the negative lens unit Ln can be reduced.

The zoom lens according to the first exemplary embodiment satisfies the conditions (2) and (3). In addition, the wide-angle end and telephoto end composite focal lengths of the first and second lens units L1 and L2 are negative, and the conditions (4) and (5) are satisfied. Therefore, at the wide-angle end as well as the telephoto end, the positive lens unit Lp and the negative lens unit Ln are allowed to effectively have an afocal relation therebetween, so that it is possible to reduce the variation of spherical aberration and axial chromatic aberration of the lens unit Ln during focusing and achieve the miniaturization and the high performance. In addition, the wide-angle end and telephoto end composite focal lengths of the fifth and sixth lens units L5 and L6 are positive, and the conditions (8) and (9) are satisfied.

Accordingly, after an afocal light flux is converted into a diverging light flux by the negative lens unit Ln, and the light flux is allowed to converge to the image plane again, so that it is possible to effectively implement the miniaturization and the high performance. In addition, the position of the negative lens unit Ln on the optical axis satisfies the condition (10), so that it is possible to simultaneously widen the angle of view and implement the miniaturization effectively without loss of the retro-focus type power arrangement.

During zooming from the wide-angle end to the telephoto end, the negative lens unit Ln is moved toward the image side relatively with respect to the positive lens unit Lp. The zoom lens according to the present exemplary embodiment may be considered to be a zoom lens where the positive lens unit Lp and the negative lens unit Ln are inserted between the second and third lens units in the four-unit zoom lens including lens units having positive, negative, positive, and positive refractive powers. In this case, the empty distance between the positive lens unit Lp and the negative lens unit Ln needs to be secured just in proportion to the thickness of the positive lens unit Lp and the negative lens unit Ln and the focus-driving space thereof.

Therefore, in comparison with the second and third lens units of the four-unit zoom lens, in the second and fifth lens units L2 and L5 according to the present exemplary embodiment, the effect of the variation of magnification is lost. However, in proportion to the lost amount, the negative lens unit Ln having a relatively strong refractive power is moved to the image side with respect to the positive lens unit Lp from the wide-angle end to the telephoto end, so that the equivalent effect of the variation of magnification is obtained. More specifically, the condition (11) is satisfied, so that a focus-driving space of the negative lens unit Ln can be effectively allocated to the variation of magnification.

The zoom lens according to the second exemplary embodiment includes a first lens unit L1 having a negative refractive power, a second lens unit L2 having a positive refractive power, a third lens unit L3 having a negative refractive power, a fourth lens unit L4 having a positive refractive power and including an aperture stop SP, and a fifth lens unit L5 having a positive refractive power in order from an object side to an image side. In addition, the zoom lens is configured so that, during zooming from a wide-angle end to a telephoto end, the first lens unit L1 is moved with a locus that is convex toward an image side, and the second to fifth lens units L2 to L5 are moved to an object side.

The zoom lens according to the second exemplary embodiment is a negative lead type five-unit zoom lens having a zoom ratio of 2.4. The second lens unit L2 corresponds to the positive lens unit Lp; the third lens unit L3 corresponds to the negative lens unit Ln; and focusing is performed by the negative lens unit Ln. The negative lens unit Ln includes one lens, so that it is possible to allow the focus lens unit to have a small size and light weight. In addition, the positive lens unit Lp is also configured by one positive lens, so that it is possible to allow the entire zoom lens to have a small size and light weight. The optical functions of the positive lens unit Lp, the negative lens unit Ln, the object-side lens units, and the image-side lens units are the same as those of the first exemplary embodiment.

The zoom lens according to the third exemplary embodiment includes a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power and including an aperture stop SP, and a sixth lens unit L6 having a positive refractive power. In addition, the zoom lens is configured so that, during zooming from a wide-angle end to a telephoto end, the first, third, fifth, and sixth lens units L1, L3, L5, and L6 are moved to an object side, and the second and fourth lens units L2 and L4 are moved with a locus that is convex toward an image side.

The zoom lens according to the third exemplary embodiment is a positive lead type six-unit zoom lens having a zoom ratio of 7.0. The third lens unit L3 corresponds to the positive lens unit Lp; the fourth lens unit L4 corresponds to the negative lens unit Ln; and focusing is performed by the positive lens unit Lp. The positive lens unit Lp includes one lens, so that it is possible to allow the focus lens unit to have a small size and light weight. In addition, the negative lens unit Ln is also configured by one negative lens, so that it is possible to allow the entire zoom lens to have a small size and light weight. The optical functions of the positive lens unit Lp, the negative lens unit Ln, the object-side lens units, and the image-side lens units are almost the same as those of the first exemplary embodiment except for the following points.

During zooming from the wide-angle end to the telephoto end, the positive lens unit Lp is moved toward the object side relatively with respect to the negative lens unit Ln.

The zoom lens according to the third exemplary embodiment may be considered to be a zoom lens where the positive lens unit Lp and the negative lens unit Ln are inserted between the second and third lens units in the four-unit zoom lens including lens units having positive, negative, positive, and positive refractive powers. In this case, the empty distance between the positive lens unit Lp and the negative lens unit Ln needs to be secured just in proportion to the thickness of the positive lens unit Lp and the negative lens unit Ln and the focus-driving space thereof.

Therefore, in comparison with the second and third lens units of the four-unit zoom lens, in the second and fifth lens units L2 and L5 according to the exemplary embodiment, the effect of the variation of magnification is lost. However, in proportion to the lost amount, the positive lens unit Lp having a relatively strong refractive power is moved to the object side with respect to the negative lens unit Ln from the wide-angle end to the telephoto end, so that the equivalent effect of the variation of magnification is obtained. More specifically, the condition (11) is satisfied, so that a focus-driving space of the positive lens unit Lp can be effectively allocated to the variation of magnification.

The zoom lens according to the fourth exemplary embodiment includes a first lens unit L1 having a positive refractive power, a second lens unit L2 having a negative refractive power, a third lens unit L3 having a positive refractive power, a fourth lens unit L4 having a negative refractive power, and a fifth lens unit L5 having a positive refractive power and including an aperture stop SP in order from an object side to an image side. In addition, the zoom lens is configured so that, during zooming from a wide-angle end to a telephoto end, the first lens unit L1 and the third to fifth lens units L3 to L5 are moved to the object side, and the second lens unit L2 is moved with a locus that is convex toward the image side.

The zoom lens according to the fourth exemplary embodiment is a positive lead type five-unit zoom lens having a zoom ratio of 5.6. The third lens unit L3 corresponds to the positive lens unit Lp; the fourth lens unit L4 corresponds to the negative lens unit Ln; and focusing is performed by the negative lens unit Ln. The negative lens unit Ln includes one lens, so that it is possible to allow the focus lens unit to have a small size and light weight. In addition, the positive lens unit Lp is also configured by one positive lens, so that it is possible to allow the entire zoom lens to have a small size and light weight. The optical functions of the positive lens unit Lp, the negative lens unit Ln, the object-side lens units, and the image-side lens units are the same as those of the first exemplary embodiment.

The zoom lens according to the fifth exemplary embodiment includes a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power and including an aperture stop SP, and a sixth lens unit L6 having a positive refractive power. In addition, the zoom lens is configured so that, during zooming from a wide-angle end to a telephoto end, the first lens unit L1, the third to sixth lens units L3 to L6 are moved to an object side, and the second lens unit L2 is moved with a locus that is convex toward an image side. The zoom lens according to the fifth exemplary embodiment is a positive lead type six-unit zoom lens having a zoom ratio of 6.5.

The third lens unit L3 corresponds to the positive lens unit Lp; the fourth lens unit L4 corresponds to the negative lens unit Ln; and focusing is performed by the negative lens unit Ln. The negative lens unit Ln includes two lenses, so that it is possible to allow the focus lens unit to have a small size and light weight. In addition, the positive lens unit Lp includes one lens, so that it is possible to allow the entire zoom lens to have a small size and light weight. The optical functions of the positive lens unit Lp, the negative lens unit Ln, the object-side lens units, and the image-side lens units are the same as those of the first exemplary embodiment.

The zoom lens according to the sixth exemplary embodiment includes a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power and including an aperture stop SP, and a sixth lens unit L6 having a positive refractive power. In addition, the zoom lens is configured so that, during zooming from a wide-angle end to a telephoto end, the first lens unit L1 and the third to sixth lens units L3 to L6 are moved to an object side, and the second lens unit L2 is moved with a locus that is convex toward an image side.

The zoom lens according to the sixth exemplary embodiment is a positive lead type six-unit zoom lens having a zoom ratio of 7.0. The third lens unit L3 corresponds to the positive lens unit Lp; the fourth lens unit L4 corresponds to the negative lens unit Ln; and focusing is performed by the positive lens unit Lp and the negative lens unit Ln. Each of the positive lens unit Lp and the negative lens unit Ln includes one lens, so that it is possible to allow the focus lens unit to have a small size and light weight. The optical functions of the positive lens unit Lp, the negative lens unit Ln, the object-side lens units, and the image-side lens units are almost the same as those of the first and third exemplary embodiments except that the positive lens unit Lp and the negative lens unit Ln are driven for focusing.

Accordingly, although the mechanical configuration becomes complicated, it is possible to further reduce the variation of aberration due to focusing.

Hereinafter, Numerical Examples 1 to 6 corresponding to the first to sixth exemplary embodiments will be described. In each numerical example, an ordinal number of a surface from an object side is denoted by "i" (where "i" is a positive integer). Where applicable, an i-th aspherical surface is denoted by an asterisk ("*") added next to the surface number. In each numerical example, a radius of curvature of the i-th lens surface in order from the object side is denoted by "ri". The i-th lens thickness or air distance in order from the object side is denoted by "di". A refractive index and an Abbe number of a material of the i-th lens in order from the object side are denoted by ndi and vdi, respectively. Back focus is denoted by "BF". When the direction of the optical axis is defined by the X axis, the direction perpendicular to the optical axis is defined by the H axis, the propagation direction of the light from the object side to the image side is defined to be positive, a radius of paraxial curvature is denoted by "r", and aspheric coefficients are denoted by A4, A6, A8, A10, and A12, respectively, the aspherical shape can be expressed by the following equation:

$$X = \frac{H^2/r}{1+(1-(H/r)^2)^{1/2}} + A4 \cdot H^4 + A6 \cdot H^6 + A8 \cdot H^8 + A10 \cdot H^{10} + A12 \cdot H^{12}$$

In each aspheric coefficient, "e-x" denotes "$10^{-x}$". In addition to the specification of the focal length, the F-number, and the like, an angle of view denotes a half angle of view of the entire zoom lens; an image height denotes a maximum image height determining the half angle of view; and a total lens length denotes a distance from the first lens surface to the last lens surface. The back focus BF denotes a distance from the last lens surface to the image plane. In addition, data of each lens unit represents a focal length, a length on an optical axis, a front principal point position, and a rear principal point position of each lens unit.

In addition, since a portion of which the distance d of each optical surface is indicated by (Variable) is changed during zooming, a distance between surfaces according to the focal length is listed in a separate table.

In addition, calculation results of the conditions based on lens data of Numerical Examples 1 to 6 described hereinafter are listed in Table 1.

NUMERICAL EXAMPLE 1

Unit: mm

| Surface number | r | d | nd | vd | Effective diameter |
|---|---|---|---|---|---|
| 1 | ∞ | 1.50 | | | 60.02 |
| 2 | 111.698 | 2.00 | 1.84666 | 23.9 | 52.66 |
| 3 | 55.370 | 7.65 | 1.49700 | 81.5 | 50.01 |
| 4 | 3384.032 | 0.15 | | | 49.68 |
| 5 | 53.774 | 6.23 | 1.66672 | 48.3 | 48.11 |
| 6 | 295.614 | (Variable) | | | 47.31 |
| 7 | 152.605 | 1.45 | 1.91082 | 35.3 | 30.90 |
| 8 | 15.649 | 7.30 | | | 23.59 |
| 9 | −48.289 | 1.20 | 1.77250 | 49.6 | 23.35 |
| 10 | 64.582 | 0.29 | | | 23.25 |
| 11 | 31.507 | 6.72 | 1.84666 | 23.8 | 23.64 |
| 12 | −34.468 | 1.10 | 1.77250 | 49.6 | 23.08 |
| 13 | 145.612 | (Variable) | | | 22.11 |
| 14 | 87.716 | 1.95 | 1.78472 | 25.7 | 14.57 |
| 15 | −58.571 | (Variable) | | | 14.57 |
| 16 | −34.608 | 0.70 | 1.90366 | 31.3 | 14.18 |
| 17 | 579.002 | (Variable) | | | 14.45 |
| 18 | 22.161 | 4.00 | 1.60311 | 60.6 | 16.08 |
| 19 | −55.101 | 1.61 | | | 15.76 |
| 20 (Stop) | ∞ | 3.30 | | | 14.77 |
| 21 | 30.440 | 4.91 | 1.60311 | 60.6 | 13.77 |
| 22 | −17.452 | 0.75 | 1.84666 | 23.8 | 12.84 |
| 23 | −494.346 | 3.07 | | | 12.52 |
| 24 | −24.672 | 0.70 | 1.80000 | 29.8 | 11.77 |
| 25 | 13.389 | 2.54 | 1.84666 | 23.8 | 11.95 |
| 26 | 53.386 | (Variable) | | | 12.01 |
| 27* | 94.305 | 3.99 | 1.68893 | 31.1 | 15.40 |
| 28 | −27.400 | | | | 16.47 |

Aspheric surface data
27th Surface

K = 0.00000e+000    A4 = −2.62044e−005    A6 = 2.02686e−009
A8 = −4.13481e−011   A10 = −7.33645e−012   A12 = 7.19025e−014

Various data
Zoom ratio: 7.02

| | Wide-angle | Middle | Telephoto |
|---|---|---|---|
| Focal length | 18.60 | 51.00 | 130.50 |
| F-number | 3.48 | 4.84 | 5.88 |
| Angle of view | 36.29 | 14.99 | 5.98 |
| Image height | 13.66 | 13.66 | 13.66 |
| Total lens length | 140.52 | 160.20 | 190.00 |
| BF | 35.60 | 56.40 | 71.56 |
| d6 | 0.90 | 21.92 | 42.41 |
| d13 | 26.18 | 6.70 | 1.50 |
| d15 | 2.83 | 4.19 | 8.87 |
| d17 | 7.09 | 5.73 | 1.05 |
| d26 | 4.80 | 2.15 | 1.50 |

Data of units of zoom lens

| Unit | Leading surface | Focal length | Lens structure length | Front principal point position | Rear principal point position |
|---|---|---|---|---|---|
| 1 | 1 | 88.69 | 17.53 | 5.86 | −5.78 |
| 2 | 7 | −17.44 | 18.06 | 1.34 | −11.69 |
| 3 | 14 | 45.02 | 1.95 | 0.66 | −0.44 |
| 4 | 16 | −36.12 | 0.70 | 0.02 | −0.35 |
| 5 | 18 | 37.72 | 20.89 | −21.54 | −23.56 |
| 6 | 27 | 31.24 | 3.99 | 1.85 | −0.54 |

NUMERICAL EXAMPLE 2

Unit: mm

Data of surface

| Surface number | r | d | nd | vd | Effective diameter |
|---|---|---|---|---|---|
| 1 | ∞ | 1.50 | | | 50.25 |
| 2 | 57.445 | 4.55 | 1.60311 | 60.6 | 41.82 |
| 3 | 219.037 | 0.50 | | | 39.96 |
| 4 | 36.443 | 1.45 | 1.83481 | 42.7 | 32.01 |
| 5 | 14.175 | 7.58 | | | 24.39 |
| 6 | −619.065 | 1.20 | 1.77250 | 49.6 | 24.02 |
| 7 | 25.691 | 3.98 | | | 22.57 |
| 8 | 23.423 | 4.90 | 1.80518 | 25.4 | 22.94 |
| 9 | 200.752 | 1.10 | 1.80400 | 46.6 | 21.98 |
| 10 | 41.851 | (Variable) | | | 21.04 |
| 11 | −229.585 | 1.73 | 1.60311 | 60.6 | 13.06 |
| 12 | −34.65 | (Variable) | | | 13.21 |
| 13 | −32.574 | 0.70 | 1.83400 | 37.2 | 13.12 |
| 14 | −276.813 | (Variable) | | | 13.34 |
| 15 | 28.173 | 3.13 | 1.63854 | 55.4 | 13.98 |
| 16 | −53.605 | 1.04 | | | 13.99 |
| 17 (Stop) | ∞ | 3.30 | | | 13.66 |
| 18 | 22.851 | 4.24 | 1.60311 | 60.6 | 13.49 |
| 19 | −21.794 | 0.75 | 1.85026 | 32.3 | 12.87 |
| 20 | −162.935 | 2.71 | | | 12.64 |
| 21 | −40.305 | 0.70 | 1.74950 | 35.3 | 11.89 |
| 22 | 15.099 | 1.99 | 1.84666 | 23.8 | 11.81 |
| 23 | 25.535 | (Variable) | | | 11.71 |
| 24* | 103.888 | 3.69 | 1.58313 | 59.4 | 14.34 |
| 25 | −22.955 | | | | 15.38 |

Aspheric surface data
24th Surface

K = 0.00000e+000    A4 = −2.73707e−005    A6 = −2.63537e−008
A8 = 1.01748e−009   A10 = −1.40793e−011   A12 = −1.53554e−022

Various data
Zoom ratio: 2.42

| | Wide-angle | Middle | Telephoto |
|---|---|---|---|
| Focal length | 18.59 | 24.00 | 45.00 |
| F-number | 3.59 | 4.06 | 5.95 |
| Angle of view | 36.31 | 29.65 | 16.89 |
| Image height | 13.66 | 13.66 | 13.66 |
| Total lens length | 118.97 | 117.26 | 127.42 |
| BF | 35.70 | 42.77 | 68.38 |
| d10 | 23.35 | 15.60 | 2.10 |
| d12 | 3.02 | 3.73 | 3.73 |
| d14 | 1.88 | 1.16 | 1.17 |
| d23 | 4.27 | 3.24 | 1.30 |

Data of units of zoom lens

| Unit | Leading surface | Focal length | Lens structure length | Front principal point position | Rear principal point position |
|---|---|---|---|---|---|
| 1 | 1 | −24.19 | 26.76 | 10.07 | −10.77 |
| 2 | 11 | 67.44 | 1.73 | 1.26 | 0.19 |
| 3 | 13 | −44.32 | 0.70 | −0.05 | −0.43 |
| 4 | 15 | 32.81 | 17.87 | −13.46 | −18.43 |
| 5 | 24 | 32.59 | 3.69 | 1.93 | −0.43 |

NUMERICAL EXAMPLE 3

Unit: mm

Data of surface

| Surface number | R | d | nd | vd | Effective diameter |
|---|---|---|---|---|---|
| 1 | ∞ | 1.50 | | | 59.50 |
| 2 | 136.714 | 1.90 | 1.84666 | 23.8 | 57.10 |
| 3 | 61.723 | 8.41 | 1.49700 | 81.5 | 54.57 |
| 4 | −712.008 | 0.15 | | | 53.99 |
| 5 | 55.292 | 6.38 | 1.77250 | 49.6 | 51.49 |
| 6 | 218.242 | (Variable) | | | 50.63 |
| 7 | 239.607 | 1.45 | 1.83481 | 42.7 | 30.66 |
| 8 | 14.432 | 7.38 | | | 22.80 |
| 9 | −44.308 | 1.20 | 1.77250 | 49.6 | 22.69 |
| 10 | 71.255 | 0.15 | | | 22.79 |
| 11 | 30.488 | 5.77 | 1.84666 | 23.8 | 23.27 |
| 12 | −48.245 | 1.10 | 1.83481 | 42.7 | 22.82 |
| 13 | 105.391 | (Variable) | | | 22.15 |
| 14 | 114.988 | 2.94 | 1.83481 | 42.7 | 20.08 |
| 15 | −38.856 | (Variable) | | | 19.84 |
| 16 | −42.545 | 0.7 | 1.80610 | 40.9 | 18.21 |
| 17 | 104.476 | (Variable) | | | 17.74 |
| 18 | 20.554 | 3.7 | 1.53996 | 59.5 | 15.88 |
| 19 | −92.362 | 1.18 | | | 15.50 |
| 20 (Stop) | ∞ | 3.30 | | | 14.91 |
| 21 | 25.900 | 4.34 | 1.48749 | 70.2 | 14.11 |
| 22 | −21.604 | 0.75 | 1.84666 | 23.8 | 13.39 |
| 23 | −213.343 | 3.09 | | | 13.2 |
| 24 | −46.278 | 0.70 | 1.76200 | 40.1 | 12.48 |
| 25 | 19.900 | 2.11 | 1.84666 | 23.8 | 12.47 |
| 26 | 52.323 | (Variable) | | | 12.42 |
| 27* | 114.978 | 3.14 | 1.58313 | 59.4 | 15.12 |
| 28 | −31.788 | | | | 15.82 |

Aspheric surface data
27th Surface

K = 0.00000e+000  A4 = −3.32763e−005  A6 = 7.41615e−008
A8 = −3.14564e−009  A10 = 4.14055e−011  A12 = −2.46577e−013

Various data
Zoom ratio: 7.05

| | Wide-angle | Middle | Telephoto |
|---|---|---|---|
| Focal length | 18.59 | 50.00 | 131.00 |
| F-number | 3.51 | 4.71 | 5.88 |
| Angle of view | 36.31 | 15.28 | 5.95 |
| Image height | 13.66 | 13.66 | 13.66 |
| Total lens length | 138.97 | 159.44 | 187.88 |
| BF | 35.70 | 55.36 | 72.74 |
| d6 | 1.00 | 22.00 | 40.44 |
| d13 | 7.85 | 6.05 | 1.52 |
| d15 | 2.91 | 4.71 | 9.25 |
| d17 | 23.69 | 7.04 | 1.05 |
| d26 | 6.47 | 2.94 | 1.55 |

Data of units of zoom lens

| Unit | Leading surface | Focal length | Lens structure length | Front principal point position | Rear principal point position |
|---|---|---|---|---|---|
| 1 | 1 | 84.91 | 18.34 | 6.47 | −5.44 |
| 2 | 7 | −15.06 | 17.05 | 2.01 | −10.00 |
| 3 | 14 | 35.09 | 2.94 | 1.21 | −0.41 |
| 4 | 16 | −37.43 | 0.70 | 0.11 | −0.27 |
| 5 | 18 | 41.45 | 19.18 | −15.02 | −21.67 |
| 6 | 27 | 43.05 | 3.14 | 1.56 | −0.43 |

NUMERICAL EXAMPLE 4

Unit: mm

Data of surface

| Surface number | r | d | nd | vd | Effective diameter |
|---|---|---|---|---|---|
| 1 | ∞ | 1.50 | | | 64.10 |
| 2 | 127.922 | 2.00 | 1.84666 | 23.8 | 56.80 |
| 3 | 76.612 | 6.62 | 1.49700 | 81.5 | 55.32 |
| 4 | 1483.135 | 0.15 | | | 54.89 |
| 5 | 66.859 | 5.86 | 1.60738 | 56.8 | 52.97 |
| 6 | 325.080 | (Variable) | | | 52.19 |
| 7 | 79.300 | 1.45 | 1.91082 | 35.3 | 34.09 |
| 8 | 15.595 | 8.10 | | | 25.60 |
| 9 | −84.291 | 1.20 | 1.83481 | 42.7 | 25.41 |
| 10 | 42.660 | 1.31 | | | 25.09 |
| 11 | 30.665 | 6.60 | 1.84666 | 23.8 | 25.97 |
| 12 | −61.686 | 1.10 | 1.77250 | 49.6 | 25.43 |
| 13 | 413.544 | (Variable) | | | 24.76 |
| 14 | 55.003 | 1.64 | 1.80518 | 25.4 | 14.39 |
| 15 | 1371.106 | (Variable) | | | 14.24 |
| 16 | −38.056 | 0.70 | 1.90366 | 31.3 | 13.97 |
| 17 | −408.051 | (Variable) | | | 14.24 |
| 18 | 23.610 | 3.66 | 1.60311 | 60.6 | 15.70 |
| 19 | −91.277 | 1.17 | | | 15.49 |
| 20 (Stop) | ∞ | 2.00 | | | 14.83 |
| 21 | 26.328 | 5.54 | 1.60311 | 60.6 | 14.37 |
| 22 | −23.088 | 0.75 | 1.80000 | 29.8 | 13.27 |
| 23 | −67.471 | 0.99 | | | 12.99 |
| 24 | −65.002 | 0.70 | 1.74950 | 35.3 | 12.45 |
| 25 | 15.384 | 1.91 | 1.77250 | 49.6 | 11.97 |
| 26 | 22.891 | 1.68 | | | 11.65 |
| 27 | 335.732 | 3.52 | 1.66680 | 33.0 | 11.80 |
| 28 | −9.868 | 0.80 | 1.72047 | 34.7 | 11.95 |
| 29 | 630.852 | 0.15 | | | 12.47 |
| 30 | 27.288 | 2.71 | 1.85400 | 40.4 | 12.79 |
| 31* | 110.032 | | | | 12.83 |

Aspheric surface data
31st Surface

K = 0.00000e+000  A4 = 2.99992e−005  A6 = −4.29579e−008
A8 = 2.42140e−009  A10 = −2.39016e−011  A12 = −6.58966e−014

Various data
Zoom ratio: 5.59

| | Wide-angle | Middle | Telephoto |
|---|---|---|---|
| Focal length | 18.60 | 50.00 | 103.95 |
| F-number | 3.60 | 5.09 | 5.88 |
| Angle of view | 36.29 | 15.28 | 7.49 |
| Image height | 13.66 | 13.66 | 13.66 |
| Total lens length | 140.57 | 159.78 | 190.00 |
| BF | 35.64 | 56.33 | 67.17 |
| d6 | 0.90 | 24.00 | 48.93 |
| d13 | 31.63 | 7.05 | 1.50 |
| d15 | 3.12 | 4.63 | 7.52 |
| d17 | 5.45 | 3.94 | 1.05 |

Data of units of zoom lens

| Unit | Leading surface | Focal length | Lens structure length | Front principal point position | Rear principal point position |
|---|---|---|---|---|---|
| 1 | 1 | 112.03 | 16.13 | 4.60 | −6.23 |
| 2 | 7 | −21.44 | 19.76 | 0.40 | −15.24 |
| 3 | 14 | 71.13 | 1.64 | −0.04 | −0.95 |
| 4 | 16 | −46.49 | 0.70 | −0.04 | −0.41 |
| 5 | 18 | 26.79 | 25.59 | 0.25 | −17.82 |

NUMERICAL EXAMPLE 5

Unit: mm

Data of surface

| Surface number | r | d | nd | vd | Effective diameter |
|---|---|---|---|---|---|
| 1 | ∞ | 1.50 | | | 64.00 |
| 2 | 95.457 | 2.00 | 1.84666 | 23.8 | 55.24 |
| 3 | 58.651 | 7.76 | 1.49700 | 81.5 | 51.80 |
| 4 | 6401.039 | 0.15 | | | 51.35 |
| 5 | 52.248 | 6.39 | 1.60311 | 60.6 | 49.00 |
| 6 | 239.934 | (Variable) | | | 48.07 |
| 7 | 165.361 | 1.45 | 1.91082 | 35.3 | 31.91 |
| 8 | 15.531 | 7.54 | | | 23.98 |
| 9 | −49.402 | 1.20 | 1.77250 | 49.6 | 23.78 |
| 10 | 66.413 | 0.15 | | | 23.65 |
| 11 | 30.087 | 6.94 | 1.84666 | 23.8 | 24.00 |
| 12 | −34.011 | 1.10 | 1.80400 | 46.6 | 23.35 |
| 13 | 87.371 | (Variable) | | | 22.18 |
| 14 | 100.574 | 1.83 | 1.80000 | 29.8 | 14.43 |
| 15 | −68.699 | (Variable) | | | 14.33 |
| 16 | −34.220 | 0.70 | 1.90366 | 31.3 | 14.10 |
| 17 | 126.844 | 1.50 | 1.84666 | 23.8 | 14.46 |
| 18 | −120.827 | (Variable) | | | 14.73 |
| 19 | 22.762 | 3.93 | 1.51633 | 64.1 | 16.22 |
| 20 | −47.446 | 0.83 | | | 15.96 |
| 21 (Stop) | ∞ | 3.30 | | | 15.30 |
| 22 | 21.131 | 5.11 | 1.60311 | 60.6 | 14.32 |
| 23 | −22.970 | 0.75 | 1.84666 | 23.8 | 13.16 |
| 24 | 34.807 | 3.44 | | | 12.56 |
| 25 | −39.697 | 0.70 | 1.80000 | 29.8 | 12.16 |
| 26 | 11.148 | 3.12 | 1.84666 | 23.8 | 12.29 |
| 27 | 89.644 | (Variable) | | | 12.35 |
| 28* | 52.726 | 3.53 | 1.68893 | 31.1 | 14.48 |
| 29 | −45.855 | | | | 15.19 |

Aspheric surface data
28th Surface

K = 0.00000e+000  A4 = −3.62046e−005  A6 = −6.64907e−009
A8 = −8.20333e−010  A10 = 3.23308e−012  A12 = 1.82226e−014

Various data
Zoom ratio: 6.45

| | | | |
|---|---|---|---|
| Focal length | 18.60 | 50.00 | 120.00 |
| F-number | 3.48 | 4.90 | 5.88 |
| Angle of view | 36.29 | 15.28 | 6.49 |
| Image height | 13.66 | 13.66 | 13.66 |
| Total lens length | 140.51 | 161.85 | 190.00 |
| BF | 35.6 | 57.97 | 73.10 |
| d6 | 0.90 | 19.59 | 38.16 |
| d13 | 24.74 | 6.80 | 1.53 |
| d15 | 3.31 | 4.95 | 9.74 |
| d18 | 7.48 | 5.84 | 1.05 |
| d27 | 3.56 | 1.79 | 1.50 |

Data of units of zoom lens

| Unit | Leading surface | Focal length | Lens structure length | Front principal point position | Rear principal point position |
|---|---|---|---|---|---|
| 1 | 1 | 84.52 | 17.79 | 5.05 | −6.91 |
| 2 | 7 | −15.67 | 18.38 | 2.05 | −10.62 |
| 3 | 14 | 51.27 | 1.83 | 0.61 | −0.42 |
| 4 | 16 | −50.94 | 2.20 | −0.41 | −1.61 |
| 5 | 19 | 44.31 | 21.18 | −20.88 | −25.10 |
| 6 | 28 | 36.13 | 3.53 | 1.13 | −0.99 |

NUMERICAL EXAMPLE 6

Unit: mm

Data of surface

| Surface number | r | d | nd | vd | Effective diameter |
|---|---|---|---|---|---|
| 1 | ∞ | 1.50 | | | 60.25 |
| 2 | 111.688 | 2.00 | 1.84666 | 23.8 | 52.90 |
| 3 | 54.774 | 7.45 | 1.49700 | 81.5 | 48.68 |
| 4 | 12582.119 | 0.15 | | | 48.38 |
| 5 | 50.826 | 6.20 | 1.66672 | 48.3 | 47.00 |
| 6 | 252.499 | (Variable) | | | 46.20 |
| 7 | 147.037 | 1.45 | 1.91082 | 35.3 | 31.20 |
| 8 | 15.764 | 7.30 | | | 23.79 |
| 9 | −49.119 | 1.20 | 1.77250 | 49.6 | 23.57 |
| 10 | 55.922 | 0.20 | | | 23.38 |
| 11 | 31.138 | 6.76 | 1.84666 | 23.8 | 23.70 |
| 12 | −34.147 | 1.10 | 1.77250 | 49.6 | 23.12 |
| 13 | 158.890 | (Variable) | | | 22.11 |
| 14 | 99.573 | 1.94 | 1.78472 | 25.7 | 15.32 |
| 15 | −60.620 | (Variable) | | | 15.07 |
| 16 | −35.790 | 0.70 | 1.90366 | 31.3 | 14.52 |
| 17 | −1633.629 | (Variable) | | | 14.69 |
| 18 | 23.157 | 3.96 | 1.60311 | 60.6 | 16.25 |
| 19 | −59.550 | 1.30 | | | 15.93 |
| 20 (Stop) | ∞ | 3.42 | | | 15.11 |
| 21 | 27.323 | 4.96 | 1.60311 | 60.6 | 14.10 |
| 22 | −19.541 | 0.75 | 1.84666 | 23.8 | 13.10 |
| 23 | 137.525 | 3.12 | | | 12.71 |
| 24 | −32.099 | 0.70 | 1.80000 | 29.8 | 12.08 |
| 25 | 11.916 | 2.77 | 1.84666 | 23.8 | 12.22 |
| 26 | 46.420 | (Variable) | | | 12.29 |
| 27* | 68.211 | 3.84 | 1.68893 | 31.1 | 15.01 |
| 28 | −31.654 | | | | 15.98 |

Aspheric surface data
27th Surface

K = 0.00000e+000  A4 = −2.82069e−005  A6 = −2.08522e−008
A8 = 3.41633e−010  A10 = −1.37913e−011  A12 = 1.14524e−013

Various data
Zoom ratio: 7.01

| | Wide-angle | Middle | Telephoto |
|---|---|---|---|
| Focal length | 18.62 | 51.01 | 130.47 |
| F-number | 3.46 | 4.80 | 5.88 |
| Angle of view | 36.27 | 14.99 | 5.98 |
| Image height | 13.66 | 13.66 | 13.66 |
| Total lens length | 140.28 | 158.59 | 189.71 |
| BF | 35.65 | 56.36 | 72.60 |
| d6 | 0.90 | 20.86 | 40.26 |
| d13 | 24.23 | 1.50 | 1.50 |
| d15 | 2.88 | 4.92 | 10.03 |
| d17 | 9.67 | 10.35 | 1.05 |
| d26 | 4.18 | 1.83 | 1.50 |

Data of units of zoom lens

| Unit | Leading surface | Focal length | Lens structure length | Front principal point position | Rear principal point position |
|---|---|---|---|---|---|
| 1 | 1 | 85.67 | 17.29 | 5.71 | −5.75 |
| 2 | 7 | −17.27 | 18.01 | 1.46 | −11.47 |
| 3 | 14 | 48.27 | 1.94 | 0.68 | −0.41 |
| 4 | 16 | −40.50 | 0.70 | −0.01 | −0.38 |
| 5 | 18 | 41.08 | 20.98 | −22.87 | −24.67 |
| 6 | 27 | 31.88 | 3.84 | 1.58 | −0.73 |

TABLE 1

| Condition | | Numerical Example 1 | Numerical Example 2 | Numerical Example 3 |
|---|---|---|---|---|
| | Lens Type | Positive | Negative | Positive |
| | | Negative | Positive | Negative |
| | | Positive | Negative | Positive |
| | | Negative | Positive | Negative |
| | | Positive | Positive | Positive |
| | | Positive | | Positive |
| | Focus | Fourth Lens Unit | Third Lens Unit | Fourth Lens Unit |
| | Fw | 18.600 | 18.591 | 18.590 |
| | Ft | 130.497 | 45.002 | 131.001 |
| | Fn | −36.118 | −44.324 | −37.426 |
| | Fp | 45.019 | 67.440 | 35.095 |
| | Ffw | −24.453 | −24.193 | −20.829 |
| | Fft | −71.149 | −24.193 | −58.236 |
| | Frw | 30.414 | 26.224 | 32.568 |
| | Frt | 28.026 | 24.445 | 29.880 |
| | Mft | −6.581 | −1.879 | 7.578. |
| | Mz | −6.041 | 0.711 | −6.336 |
| (2) | βnw | −0.269 | 0.079 | −0.084 |
| (3) | βnt | −0.005 | 0.325 | −0.095 |
| | βpw | −2.857 | 8.579 | −12.895 |
| | βpt | −176.265 | 2.316 | −11.613 |
| | Dnw | 72.354 | 64.445 | 89.210 |
| (1) | \|Fp/Fn\| | 1.246 | 1.522 | 0.938 |
| (6) | βpw × βnw | 0.769 | 0.681 | 1.080 |
| (7) | βpt × βnt | 0.802 | 0.752 | 1.099 |
| (11) | \|Mz/Mft\| | 0.918 | 0.379 | 0.836 |
| (4) | \|Ffw/Fp\| | 0.543 | 0.359 | 0.594 |
| (5) | \|Fft/Fp\| | 1.580 | 0.359 | 1.659 |
| (8) | \|Frw/Fn\| | 0.842 | 0.592 | 0.870 |
| (9) | \|Frt/Fn\| | 0.776 | 0.552 | 0.798 |

| Condition | | Numerical Example 4 | Numerical Example 5 | Numerical Example 6 |
|---|---|---|---|---|
| | Lens Type | Positive | Positive | Positive |
| | | Negative | Negative | Negative |
| | | Positive | Positive | Positive |
| | | Negative | Negative | Negative |
| | | Positive | Positive | Positive |
| | | | Positive | Positive |
| | Focus | Fourth Lens Unit | Fourth Lens Unit | Third and Fourth Lens Units |
| | Fw | 18.603 | 18.600 | 18.616 |
| | Ft | 103.945 | 120.000 | 130.466 |
| | Fn | −46.487 | −50.936 | −40.502 |
| | Fp | 71.126 | 51.269 | 48.274 |
| | Ffw | −28.918 | −22.446 | −24.541 |
| | Fft | −68.568 | −60.908 | −70.708 |
| | Frw | 26.794 | 31.608 | 30.795 |
| | Frt | 26.794 | 30.372 | 28.968 |
| | Mft | −5.388 | −7.884 | — |
| | Mz | 4.398 | 6.431 | — |
| (2) | βnw | −0.024 | −0.088 | −0.176 |
| (3) | βnt | 0.195 | 0.215 | 0.054 |
| | βpw | −26.597 | −11.321 | −4.678 |
| | βpt | 3.580 | 4.440 | 15.565 |
| | Dnw | 66.609 | 71.340 | 74.315 |
| (1) | \|Fp/Fn\| | 1.530 | 1.007 | 1.192 |
| (6) | βpw × βnw | 0.647 | 0.999 | 0.823 |
| (7) | βpt × βnt | 0.698 | 0.954 | 0.836 |
| (11) | \|Mz/Mft\| | 0.816 | 0.816 | — |
| (4) | \|Ffw/Fp\| | 0.407 | 0.438 | 0.508 |
| (5) | \|Fft/Fp\| | 0.964 | 1.188 | 1.465 |
| (8) | \|Frw/Fn\| | 0.676 | 0.621 | 0.760 |
| (9) | \|Frt/Fn\| | 0.576 | 0.596 | 0.715 |

Next, an exemplary embodiment where a zoom lens according to the first to sixth exemplary embodiments is applied to an image pickup apparatus will be described with reference to FIG. 19. The image pickup apparatus according to the exemplary embodiment of the present invention includes an interchangeable lens apparatus, which includes a zoom lens, and a camera body, which is detachably connected to the interchangeable lens apparatus through a camera mounting portion and includes an imaging element which receives an optical image formed by the zoom lens and converts the optical image into an electric image signal FIG. 19 is schematic view illustrating main components of a single-lens reflex camera. In FIG. 19, reference numeral "10" represents a photographic lens including the zoom lens 1 according to the first to sixth exemplary embodiments. The zoom lens 1 is retained by a lens barrel 2, which is a retaining member. Reference numeral "20" represents a camera body. The camera body 20 includes a quick-return mirror 3, which reflects alight flux from the photographic lens 10 upwards, and a focusing screen 4, which is disposed at an image formation position of the photographic lens 10. In addition, the camera body 20 is configured to further include a pentagonal roof prism 5, which converts a reversed image formed on the focusing screen 4 into an erected image, an eyepiece lens 6 for observing the erected image, and the like.

Reference numeral "7" represents a photosensitive surface (at an image plane), where a solid-state image sensor (photoelectric conversion element), such as a CCD sensor or a CMOS sensor or a silver-halide film, receiving an image formed by a zoom lens is disposed. During the photographing, the quick return mirror 3 is retracted from the optical path, and an image is formed on the photosensitive surface 7 by the photographic lens 10. The advantages described in the first to sixth exemplary embodiments can be effectively obtained from the image pickup apparatus according to the present exemplary embodiment.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-090963 filed Apr. 15, 2011, which is hereby incorporated by reference herein in its entirety.

What is claimed is:

1. A zoom lens comprising:
   an aperture stop; and
   a plurality of lens units which are moved during zooming, wherein the plurality of lens units includes, on an object side of the aperture stop, a positive lens unit Lp having a positive refractive power and a negative lens unit Ln having a negative refractive power which is disposed to be adjacent to an image side of the positive lens unit Lp,
   wherein at least one of the positive lens unit Lp and the negative lens unit Ln includes two or less lenses which are moved during focusing, and
   wherein a composite focal length of lens units disposed on the image side of the negative lens unit Ln at a wide-angle end is positive, and a composite focal length of lens units disposed on the object side of the positive lens unit Lp at the wide-angle end is negative,
   wherein, when focal lengths of the positive and negative lens units Lp and Ln are respectively denoted by Fp and Fn, and a lateral magnification of the negative lens unit Ln at a wide-angle end is denoted by βnw, the following conditions are satisfied:

$0.5 < |Fp/Fn| < 2.0$, $|\beta nw| < 1.0$.

2. The zoom lens according to claim 1, wherein, when a lateral magnification of the negative lens unit Ln at a telephoto end is denoted by βnt, the following condition is satisfied:

$|\beta nt| < 1.0$.

3. The zoom lens according to claim 1, wherein a composite focal length of lens units disposed on the image side of the negative lens unit Ln at a telephoto end is positive, and a composite focal length of lens units disposed on the object side of the positive lens unit Lp at the telephoto end is negative.

4. The zoom lens according to claim 1, wherein, when a composite focal length of lens units disposed on the object side of the positive lens unit Lp at a wide-angle end is denoted by Ffw, the following condition is satisfied:

$0.3<|Ffw/Fp|<2.0$.

5. The zoom lens according to claim 1, wherein, when a composite focal length of lens units disposed on the object side of the positive lens unit Lp at a telephoto end is denoted by Fft, the following condition is satisfied:

$0.3<|Fft/Fp|<2.0$.

6. The zoom lens according to claim 1, wherein, when a lateral magnification of the positive lens unit Lp at a wide-angle end is denoted by $\beta pw$ and a lateral magnification of the negative lens unit Ln at the wide-angle end is denoted by $\beta nw$, the following condition is satisfied:

$0.5<\beta pw \times \beta nw<1.6$.

7. The zoom lens according to claim 1, wherein, when a lateral magnification of the positive lens unit Lp at a telephoto end is denoted by $\beta pt$ and a lateral magnification of the negative lens unit Ln at the telephoto end is denoted by $\beta nt$, the following condition is satisfied:

$0.5<\beta pt \times \beta nt<1.6$.

8. The zoom lens according to claim 1, wherein, when a composite focal length of lens units disposed on the image side of the negative lens unit Ln at a wide-angle end is denoted by Frw, the following condition is satisfied:

$0.4<|Frw/Fn|<0.95$.

9. The zoom lens according to claim 1, wherein, when a composite focal length of lens units disposed on the image side of the negative lens unit Ln at a telephoto end is denoted by Frt, the following condition is satisfied:

$0.4<|Frt/Fn|<0.95$.

10. The zoom lens according to claim 1, wherein, when a distance from a most image-side surface of the negative lens unit Ln to an image plane is denoted by Dnw and a focal length of the entire zoom lens at a wide-angle end is denoted by fw, the following condition is satisfied:

$2.5<Dnw/fw<6.0$.

11. The zoom lens according to claim 1, wherein one of the positive lens unit Lp and the negative lens unit Ln is moved during focusing, and a relative position of the one lens position with respect to the other lens unit is changed during zooming.

12. The zoom lens according to claim 11, wherein an absolute value of refractive power of the one lens unit which is moved during focusing among the positive lens unit Lp and the negative lens unit Ln is larger than that of the other lens unit.

13. The zoom lens according to claim 11, wherein the other lens unit which is not moved during focusing among the positive lens unit Lp and the negative lens unit Ln includes two or less lenses.

14. The zoom lens according to claim 11, wherein, when an amount of movement of the one lens unit, which is moved during focusing, among the positive lens unit Lp and the negative lens unit Ln at the telephoto end during focusing is denoted by Mft, the amount of movement from the object side to the image side being defined to be positive, and an amount of relative movement of the one lens unit, which is moved during focusing, with respect to the other lens unit during zooming from a wide-angle end to a telephoto end is denoted by Mz, the amount of movement from the object side to the image side being defined to be positive, the following condition is satisfied:

$0.3<|Mz/Mft|<1.0$.

15. The zoom lens according to claim 1, wherein the plurality of lens units includes, in order from the object side to the image side, a first lens unit having a positive refractive power, a second lens unit having a negative refractive power, a third lens unit having a positive refractive power, a fourth lens unit having a negative refractive power, a fifth lens unit having a positive refractive power, and a sixth lens unit having a positive refractive power, and each lens unit is moved during zooming.

16. The zoom lens according to claim 1, wherein the plurality of lens units includes, in order from the object side to the image side, a first lens unit having a positive refractive power, a second lens unit having a negative refractive power, a third lens unit having a positive refractive power, a fourth lens unit having a negative refractive power, and a fifth lens unit having a positive refractive power, and each lens unit is moved during zooming.

17. The zoom lens according to claim 1, wherein the plurality of lens units includes, in order from the object side to the image side, a first lens unit having a negative refractive power, a second lens unit having a positive refractive power, a third lens unit having a negative refractive power, a fourth lens unit having a positive refractive power, and a fifth lens unit having a positive refractive power, and each lens unit is moved during zooming.

18. The zoom lens according to claim 1, wherein the positive lens unit Lp having a positive refractive power and the negative lens unit Ln having a negative refractive power are configured to form a composite lens unit having substantially zero power.

19. An optical apparatus comprising:
a zoom lens;
an aperture stop;
a plurality of lens units which are moved during zooming; and
an image sensor configured to receive an image formed by the zoom lens,
wherein the plurality of lens units includes, on an object side of the aperture stop, a positive lens unit Lp having a positive refractive power and a negative lens unit Ln having a negative refractive power which is disposed to be adjacent to an image side of the positive lens unit Lp,
wherein at least one of the positive lens unit Lp and the negative lens unit Ln includes two or less lenses which are moved during focusing,
wherein a composite focal length of lens units disposed on the image side of the negative lens unit Ln at a wide-angle end is positive, and a composite focal length of lens units disposed on the object side of the positive lens unit Lp at the wide-angle end is negative, and
wherein, when focal lengths of the positive and negative lens units Lp and Ln are respectively denoted by Fp and Fn, a lateral magnification of the negative lens unit Ln at a wide-angle end is denoted by $\beta nw$, the following conditions are satisfied:

$0.5<|Fp/Fn|<2.0$, and $|\beta nw|<1.0$.

20. A zoom lens comprising:
an aperture stop; and
a plurality of lens units which are moved during zooming,
wherein the plurality of lens units includes, on an object side of the aperture stop, a positive lens unit Lp having a positive refractive power and a negative lens unit Ln having a negative refractive power which is disposed to be adjacent to an image side of the positive lens unit Lp,
wherein at least one of the positive lens unit Lp and the negative lens unit Ln includes two or less lenses which are moved during focusing,
wherein a composite focal length of lens units disposed on the image side of the negative lens unit Ln at a wide-angle end is positive, and a composite focal length of lens units disposed on the object side of the positive lens unit Lp at the wide-angle end is negative, and
wherein, when focal lengths of the positive and negative lens units Lp and Ln are respectively denoted by Fp and Fn, the following condition is satisfied:

$0.938\leq|Fp/Fn|<2.0$.

21. A zoom lens including, in order from an object side to an image side, a first lens unit having a positive refractive power, a second lens unit having a negative refractive power, a third lens unit having a positive refractive power, a fourth lens unit having a negative refractive power, a fifth lens unit having a positive refractive power, and a sixth lens unit having a positive refractive power, wherein each lens unit is moved during zooming, the zoom lens comprising:
an aperture stop on the image side of the fourth lens unit,
wherein at least one of the third lens unit and the fourth lens unit includes two or less lenses which are moved during focusing, and
wherein, when focal lengths of the third and fourth lens units are respectively denoted by Fp and Fn, the following condition is satisfied:

$0.5<|Fp/Fn|<2.0$.

22. A zoom lens including, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power, wherein each lens unit is moved during zooming, the zoom lens comprising:
an aperture stop on the image side of the fourth lens unit,
wherein at least one of the third lens unit and the fourth lens unit includes two or less lenses which are moved during focusing, and
wherein, when focal lengths of the third and fourth lens units are respectively denoted by Fp and Fn, the following condition is satisfied:

$0.5<|Fp/Fn|<2.0$.

23. A zoom lens including, in order from an object side to an image side, a first lens unit having a negative refractive power, a second lens unit having a positive refractive power, a third lens unit having a negative refractive power, a fourth lens unit having a positive refractive power, and a fifth lens unit having a positive refractive power, wherein each lens unit is moved during zooming, the zoom lens comprising:
an aperture stop on the image side of the third lens unit,
wherein at least one of the second lens unit and the third lens unit includes two or less lenses which are moved during focusing, and
wherein, when focal lengths of the second and the third lens units are respectively denoted by Fp and Fn, the following condition is satisfied:

$0.5<|Fp/Fn|<2.0$.

* * * * *